United States Patent
Acharya et al.

(10) Patent No.: US 12,072,440 B2
(45) Date of Patent: Aug. 27, 2024

(54) IDENTIFICATION SYSTEM FOR SUBJECT OR ACTIVITY IDENTIFICATION USING RANGE AND VELOCITY DATA

(71) Applicant: SRI International, Menlo Park, CA (US)

(72) Inventors: Girish Acharya, Redwood City, CA (US); Douglas Bercow, Menlo Park, CA (US); John Brian Burns, Palo Alto, CA (US); Bradley J. Clymer, Austin, TX (US); Aaron J. Heller, Belmont, CA (US); Jeffrey Lubin, Princeton, NJ (US); Bhaskar Ramamurthy, Los Altos, CA (US); David Watters, Sunnyvale, CA (US); Aravind Sundaresan, San Jose, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 391 days.

(21) Appl. No.: 16/497,968

(22) PCT Filed: Mar. 28, 2018

(86) PCT No.: PCT/US2018/024909
§ 371 (c)(1),
(2) Date: Sep. 26, 2019

(87) PCT Pub. No.: WO2018/183546
PCT Pub. Date: Oct. 4, 2018

(65) Prior Publication Data
US 2020/0341114 A1    Oct. 29, 2020

Related U.S. Application Data

(60) Provisional application No. 62/477,910, filed on Mar. 28, 2017.

(51) Int. Cl.
*G01S 7/41* (2006.01)
*G01S 13/58* (2006.01)

(52) U.S. Cl.
CPC .............. *G01S 7/415* (2013.01); *G01S 7/412* (2013.01); *G01S 7/417* (2013.01); *G01S 13/584* (2013.01)

(58) Field of Classification Search
CPC .......... G06N 3/0454; G06N 3/08; G06N 3/04; G06K 9/6267; G06K 9/6288;
(Continued)

(56) References Cited

U.S. PATENT DOCUMENTS 7,916,066 B1 *  3/2011  Osterweil ............. A61B 5/1117
382/115
8,345,984 B2 *  1/2013  Ji .......................... G06N 3/0454
382/190

(Continued)

FOREIGN PATENT DOCUMENTS

WO    WO-2008102291 A2 *  8/2008  ........... A61B 5/0507

OTHER PUBLICATIONS

International Preliminary Report on Patentability from International Application No. PCT/US2018/024909, Oct. 10, 2019, 7 pp.
(Continued)

*Primary Examiner* — Olumide Ajibade Akonai
(74) *Attorney, Agent, or Firm* — Shumaker & Sieffert, P.A.

(57) ABSTRACT

An identification system includes a radar sensor configured to generate a time-domain or frequency-domain signal representative of electromagnetic waves reflected from one or more objects within a three-dimensional space over a period of time and a computation engine executing on one or more processors. The computation engine is configured to process the time-domain or frequency-domain signal to generate
(Continued)

range and velocity data indicating motion by a living subject within the three-dimensional space. The computation engine is further configured to identify, based at least on the range and velocity data indicating the motion by the living subject, the living subject and output an indication of an identity of the living subject.

21 Claims, 21 Drawing Sheets

(58) Field of Classification Search
CPC ............... G06K 9/00342; G06K 9/00348; G01S 13/42; G01S 13/584; G01S 7/415; G01S 7/352; G01S 7/417; G01S 13/88; G01S 13/04; G01S 13/26; G01S 13/581; G01S 13/582; G01S 13/723; G01S 7/41; G01S 7/418; G01S 7/4808; G01S 13/505; G01S 7/412; G01S 13/56; G01S 13/867; G01S 13/726; G01S 7/411; G01S 13/06; G01S 13/931; G01S 13/89; G01S 7/354; G01S 7/356; G01S 13/343; G06F 3/017; G06F 21/32; G06F 1/3231; G06F 21/31; G06T 2207/20081; G06T 2207/20084; G06T 7/73; A61B 5/11; H01Q 1/3233
See application file for complete search history.

(56) References Cited

U.S. PATENT DOCUMENTS

| | | | | |
|---|---|---|---|---|
| 9,589,365 | B2* | 3/2017 | Zhao | G06T 7/254 |
| 10,157,309 | B2* | 12/2018 | Molchanov | G06K 9/4628 |
| 10,168,785 | B2* | 1/2019 | Molchanov | G06F 3/017 |
| 10,176,388 | B1* | 1/2019 | Ghafarianzadeh | G06N 3/0454 |
| 10,503,883 | B1* | 12/2019 | Gillian | G06F 21/32 |
| 2008/0065291 | A1* | 3/2008 | Breed | G08B 21/22 |
| | | | | 382/190 |
| 2008/0106460 | A1* | 5/2008 | Kurtz | G01S 13/34 |
| | | | | 342/99 |
| 2010/0321229 | A1* | 12/2010 | Dwelly | G01S 7/415 |
| | | | | 342/28 |
| 2011/0025546 | A1* | 2/2011 | Cook | G01S 7/2923 |
| | | | | 342/162 |
| 2012/0280900 | A1* | 11/2012 | Wang | G06F 3/0488 |
| | | | | 345/156 |
| 2013/0041856 | A1 | 2/2013 | Benitez et al. | |
| 2016/0037482 | A1* | 2/2016 | Higgins | G06Q 10/10 |
| | | | | 455/414.1 |
| 2016/0041617 | A1* | 2/2016 | Poupyrev | G01S 13/04 |
| | | | | 345/156 |
| 2016/0124512 | A1* | 5/2016 | Maruya | G06K 9/72 |
| | | | | 715/863 |
| 2016/0188967 | A1* | 6/2016 | Chang | G01B 11/14 |
| | | | | 348/148 |
| 2016/0320852 | A1* | 11/2016 | Poupyrev | G06V 40/28 |
| 2017/0043806 | A1* | 2/2017 | Muharemovic | B60K 35/00 |
| 2017/0054950 | A1 | 2/2017 | Yeo et al. | |
| 2017/0055918 | A1 | 3/2017 | Hughes et al. | |
| 2017/0097684 | A1* | 4/2017 | Lien | G06V 40/28 |
| 2017/0254882 | A1* | 9/2017 | Malik | G01S 7/412 |
| 2017/0254893 | A1* | 9/2017 | Evans | G01S 13/723 |
| 2018/0052520 | A1* | 2/2018 | Amores Llopis | G06F 3/017 |

OTHER PUBLICATIONS

International Search Report and Written Opinion of International Application No. PCT/US2018/024909, mailed Jun. 19, 2018, 9 pp.
Github, "Keras: The Python Deep Learning library", retrieved from https://keras.io/, on Jan. 6, 2020, 5 pp.

* cited by examiner

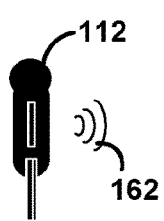 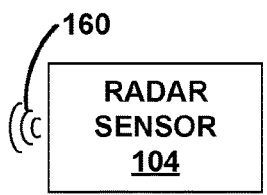 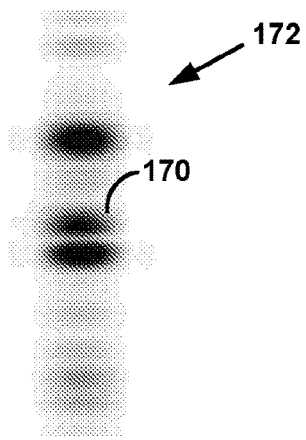
FIG. 3A  FIG. 3B
 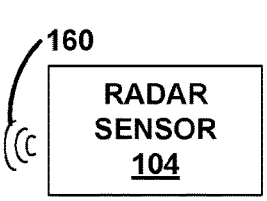 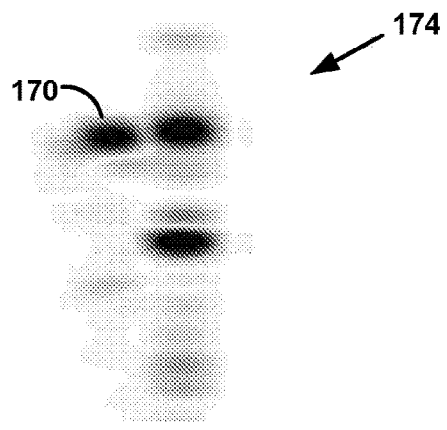
FIG. 4A  FIG. 4B
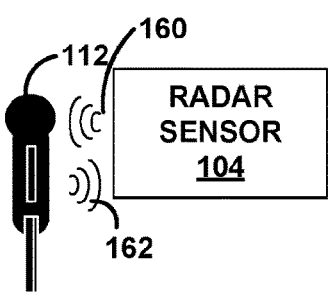 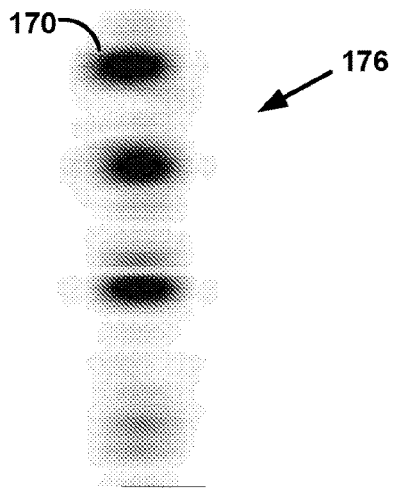
FIG. 5A  FIG. 5B

FIG. 8

| Sequence Number | Activity Key | Activity Description |
|---|---|---|
| 9 | 9 | Walk forward and back up |
| 10 | 10 | Walk to and fro |
| 11 | 11 | Jog to and fro |
| 15 | 15 | Subject 1 walks to and fro, Subject 2 is stationary |
| 16 | 16 | Subject 1 walks to and fro, Subject 2 walks in phase |
| 17 | 17 | Subject 1 walks to and fro, Subject 2 walks out-of-phase |
| 26 | 9 | Same as above for 9 - Walk forward and back up |
| 27 | 10 | Same as above for 10 - Walk to and fro |
| 28 | 11 | Same as above for 11 - Jog to and fro |

FIG. 9

| Data Splits | Sequence Numbers | | | | | | | | |
|---|---|---|---|---|---|---|---|---|---|
| | 9 | 10 | 11 | 15 | 16 | 17 | 26 | 27 | 28 |
| Walk1-a | T | T | T | | | | V | V | V |
| Walk1-b | V | V | V | | | | T | T | T |
| Walk1-mix | TV | TV | TV | TV | TV | TV | TV | TV | TV |
| Walk2-mix | TV | TV | TV | TV | TV | TV | TV | TV | TV |

FIG. 10

| Exp. No. | Maxval | Walk1-a | | | Walk1-b | | | Walk1-mix | | |
|---|---|---|---|---|---|---|---|---|---|---|
| | | epochs | Training Accuracy | Validation Accuracy | epochs | Training Accuracy | Validation Accuracy | epochs | Training Accuracy | Validation Accuracy |
| 1 | 5000 | 162 | 1.00 | 0.99 | 152 | 1.00 | 1.00 | 100 | 1.00 | 0.99 |

FIG. 11

| Exp. No. | Maxval | Walk1-a | | | Walk1-b | | | Walk1-mix | | |
|---|---|---|---|---|---|---|---|---|---|---|
| | | epochs | Training Accuracy | Validation Accuracy | epochs | Training Accuracy | Validation Accuracy | epochs | Training Accuracy | Validation Accuracy |
| 2 | 2000 | 299 | 1.00 | 0.84 | 299 | 0.30 | 0.30 | 199 | 0.97 | 0.96 |
| 3 | 5000 | 299 | 1.00 | 0.85 | 299 | 1.00 | 0.94 | 299 | 0.99 | 1.00 |

FIG. 12A

| Exp. No. | Maxval | Walk2-mix (from scratch) | | | Walk2-mix* (from walk1-mix) | | |
|---|---|---|---|---|---|---|---|
| | | epochs | Training Accuracy | Validation Accuracy | epochs | Training Accuracy | Validation Accuracy |
| 2 | 2000 | 299 | 0.293 | 0.325 | 199 | 0.99 | 1.00 |
| 3 | 5000 | 299 | 0.248 | 0.248 | 199 | 0.99 | 1.00 |

FIG. 13

| Sequence | Persons | Validation accuracy (%) | | |
|---|---|---|---|---|
| | | Walk1-mix model | Walk1-mix model (avg) | Walk2-mix model |
| 9 | 1 | 100 | 100 | 100 |
| 10 | 1 | 100 | 100 | 100 |
| 11 | 1 | 98 | 100 | 100 |
| 15 | 2 | 62 | 68 ~450 | 100 |
| 16 | 2 | 92 | 100 | 100 |
| 17 | 2 | 78 | 98 | 100 |
| 27 | 1 | 98 | 100 | 100 |
| 28 | 1 | 94 | 100 | 100 |
| 29 | 1 | 98 | 100 | 99 |

FIG. 14

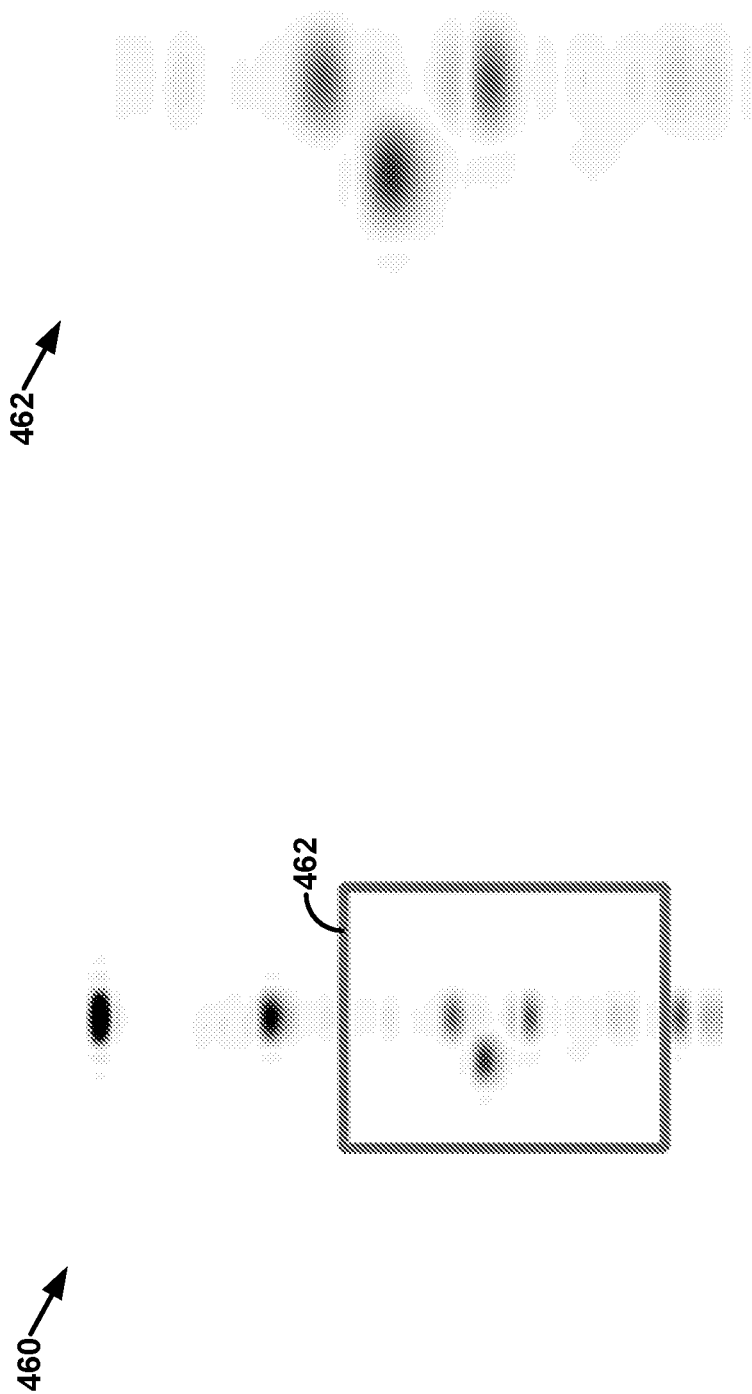

IDENTIFICATION SYSTEM FOR SUBJECT OR ACTIVITY IDENTIFICATION USING RANGE AND VELOCITY DATA

This application claims the benefit of U.S. Provisional Application No. 62/477,910 by Lubin et al., entitled "DATA ACQUISITION AND IDENTIFICATION SYSTEM," and filed on Mar. 28, 2017. The entire content of Application No. 62/477,910 is incorporated herein by reference.

GOVERNMENT RIGHTS

The invention was made with Government support. The Government has certain rights in the invention.

TECHNICAL FIELD

This disclosure relates generally to techniques for identifying living subjects and/or activities being performed by living subjects, and more specifically identifying living subjects and/or activities being performed by living subjects using range and velocity data.

BACKGROUND

Identification of living subjects typically involves use of vision technology such as cameras to capture images of visible features of a living subject and compare the visible features to earlier-captured features for the living subject. For example, a camera may generate image data representing a face of a human being. Using the image representing the face of the human being, identification systems determine one or more facial features of the human being. The identification systems identify the human being having facial features that match the one or more facial features determined from the image.

SUMMARY

In general, the disclosure describes techniques for using range and velocity data to identify a living subject or an activity performed by a living subject. For example, a radar sensor may generate a time-domain or frequency-domain signal representative of electromagnetic waves reflected from objects in a three-dimensional space that include a living subject, such as a human subject. A computation engine may process the time-domain or frequency-domain signal to generate range and velocity data that may be used to identify a living subject or an activity performed by a living subject.

For example, the computation engine may process the signal generated by the radar sensor to generate two-dimensional range-doppler images that indicate the range and velocity of objects in the three-dimensional space. The computation engine may process the range-doppler images using a machine learning system to train a model with the range and velocity data for a living subject represented in the radar-doppler images. The computation engine may then use the trained model to subsequently identify the living subject or an activity performed by a living subject from subsequent range-doppler images generated by the computation engine from subsequent electromagnetic waves reflected from the living subject subsequently in motion.

The techniques may provide one or more technical advantages. For example, identifying living subjects using range and velocity data representative of motions by the living subjects may permit reliable identification of living subjects, such as individual persons, during normal activities such as walking, sitting, and standing under natural conditions. Unlike other techniques for contactless identification, such as facial recognition, the techniques may be less prone to identification problems arising from occlusion (e.g., of the subject's face), poor lighting conditions, and limited information provided by visible features. In some examples, the techniques may also provide for more reliable identification and disambiguation of individual persons within a family unit, such as siblings, who may have similar facial features but have more variant gait and other movements that can be represented by range and velocity data.

In an example, an identification system includes a radar sensor configured to generate a time-domain or frequency-domain signal representative of electromagnetic waves reflected from one or more objects within a three-dimensional space over a period of time and a computation engine executing on one or more processors. The computation engine is configured to process the time-domain or frequency-domain signal to generate range and velocity data indicating motion by a living subject within the three-dimensional space. The computation engine is configured to identify, based at least on the range and velocity data indicating the motion by the living subject, the living subject and output an indication of an identity of the living subject.

In some examples, a method includes generating a time-domain or frequency-domain signal representative of electromagnetic waves reflected from one or more objects within a three-dimensional space over a period of time, processing, by a computation engine executing on one or more processors, the time-domain or frequency-domain signal to generate range and velocity data indicating motion by a living subject within the three-dimensional space, identifying, by the computation engine, based at least on the range and velocity data indicating the motion by the living subject, the living subject, and outputting, by the computation engine, an indication of an identity of the living subject.

In some examples, a computing system includes a memory and one or more processors coupled to the memory. The one or more processors are configured to receive a time-domain or frequency-domain signal, generated by a radar sensor, that is representative of electromagnetic waves reflected from one or more objects within a three-dimensional space over a period of time, process the time-domain or frequency-domain signal to generate range and velocity data indicating motion by a living subject within the three-dimensional space, identify, based at least on the range and velocity data indicating the motion by the living subject, the living subject, and output an indication of an identity of the living subject.

In some examples, a non-transitory computer-readable medium including instructions that, when executed, cause one or more processors to receive a time-domain or frequency-domain signal, generated by a radar sensor, that is representative of electromagnetic waves reflected from one or more objects within a three-dimensional space over a period of time, process the time-domain or frequency-domain signal to generate range and velocity data indicating motion by a living subject within the three-dimensional space, identify, based at least on the range and velocity data indicating the motion by the living subject, the living subject, and output an indication of an identity of the living subject.

In some examples, an identification system includes a radar sensor configured to generate a time-domain or frequency-domain signal representative of electromagnetic waves reflected from one or more objects within a three-dimensional space over a period of time and a computation engine executing on one or more processors. The computation engine is configured to process the time-domain or frequency-domain signal to generate range and velocity data indicating motion by a living subject within the three-dimensional space. The computation engine is configured to identify, based at least on the range and velocity data indicating the motion by the living subject, an activity being performed by the living subject and output an indication of the activity being performed by the living subject.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 3A is a conceptual diagram illustrating motion of a living subject at a first time in accordance with the techniques of the disclosure.

FIG. 3B is a conceptual diagram illustrating range and velocity data for the motion of the living subject illustrated in FIG. 3A in accordance with the techniques of the disclosure.

FIG. 4A is a conceptual diagram illustrating motion of a living subject at a second time in accordance with the techniques of the disclosure.

FIG. 4B is a conceptual diagram illustrating range and velocity data for the motion of the living subject illustrated in FIG. 4A in accordance with the techniques of the disclosure.

FIG. 5A is a conceptual diagram illustrating motion of a living subject at a third time in accordance with the techniques of the disclosure.

FIG. 5B is a conceptual diagram illustrating range and velocity data for the motion of the living subject illustrated in FIG. 5A in accordance with the techniques of the disclosure.

FIG. 8 is a conceptual diagram illustrating data collection for identification in accordance with the techniques of the disclosure.

FIG. 9 is a conceptual diagram illustrating data sequences for identification in accordance with the techniques of the disclosure.

FIG. 10 is a conceptual diagram illustrating data grouping for analysis in accordance with the techniques of the disclosure.

FIG. 11 is a conceptual diagram illustrating results for identification with a single person in a room in accordance with the techniques of the disclosure.

FIG. 12A is a conceptual diagram illustrating results for identification with a single person in a room with background removal in accordance with the techniques of the disclosure.

FIG. 13 is a conceptual diagram illustrating results for identification with two persons in a room in accordance with the techniques of the disclosure.

FIG. 14 is a conceptual diagram illustrating prediction on validation data and novel data in accordance with the techniques of the disclosure.

FIG. 20 illustrates an example range doppler image obtained from a range-doppler map along with a region of interest in accordance with the techniques of the disclosure.

FIG. 21 illustrates an example range doppler image obtained from a range-doppler map cropped to a region of interest used in a machine learning system in accordance with the techniques of the disclosure.

Like reference characters refer to like elements throughout the figures and description.

DETAILED DESCRIPTION

Figure 1:
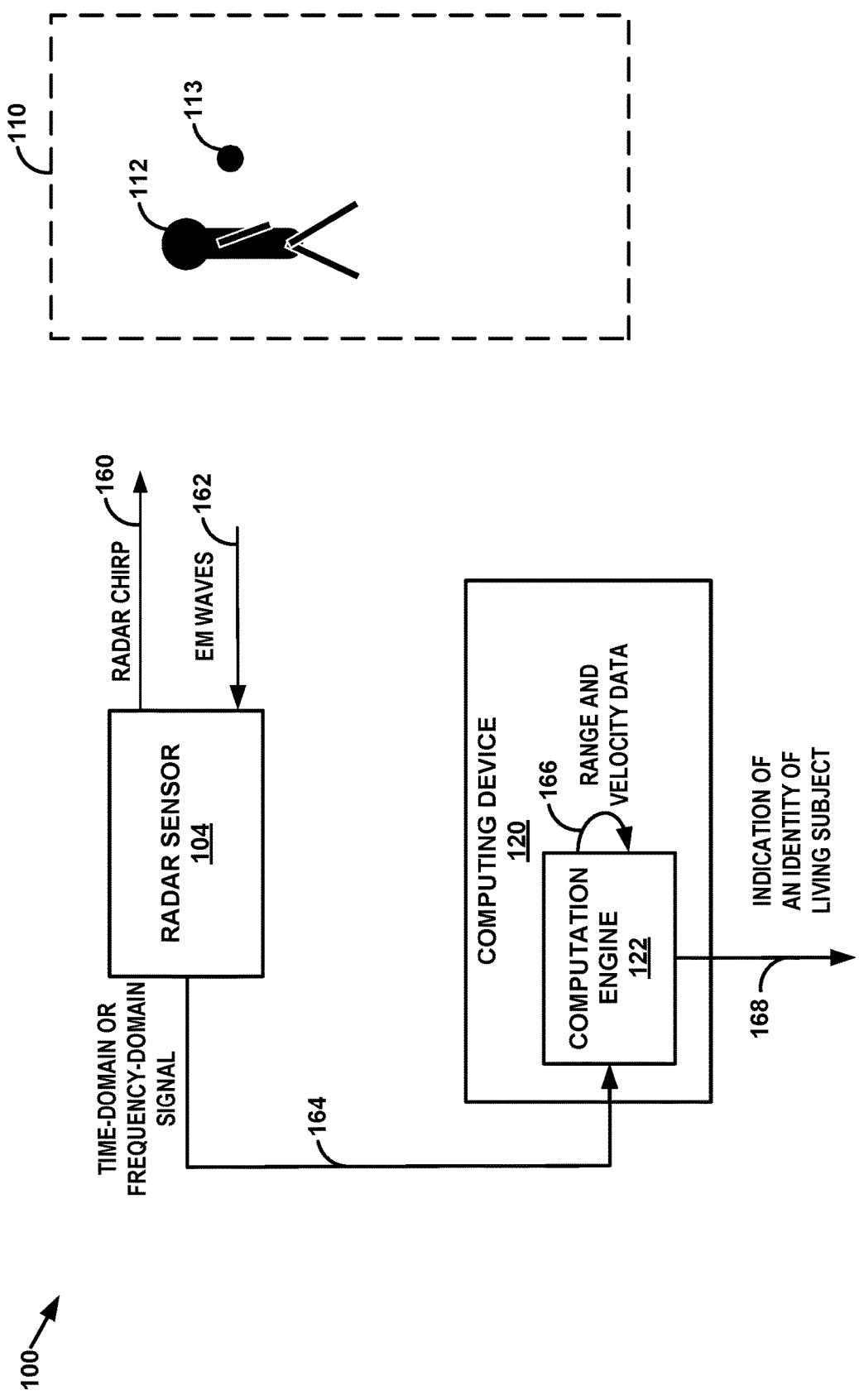
FIG. 1 is a block diagram illustrating an example identification system in accordance with the techniques of the disclosure.

FIG. 1 is a block diagram illustrating an example identification system 100 in accordance with the techniques of the disclosure. As shown, identification system 100 includes radar sensor 104 and computing device 120. Three-dimensional space 110 is illustrated as including living subject 112 that is a human subject, in other examples other living subjects may be identified. Examples of living subjects may include, but are not limited to, human beings, animals, plants, insects, or other living subjects. Moreover, in addition to living subject 112, three-dimensional space 110 may further include object 113 (e.g., a ball, table, or mobile phone held by living subject 112). However, in other examples, three-dimensional space 110 may include many additional living subjects. Examples of three-dimensional space 110 may include, but are not limited to, a room, a range of vision of radar sensor 104, auditorium, concert hall, hospital, assisted living centers, or other three-dimension spaces.

Radar sensor 104 may be configured to generate a time-domain or frequency-domain signal 164. For example, radar sensor 104 may output radar chirp 160 to three-dimensional space 110. In this example, radar sensor 104 may detect electromagnetic (EM) waves 162 that are reflected from one or more objects (e.g., living subject 112) within three-dimensional space 110. In this example, radar sensor 104 may generate time-domain or frequency-domain signal 164 using detected electromagnetic waves 162. Radar sensor 104 may use mm-wave radar, ultra-wide band (UWB), frequency-modulated continuous wave (FMCW), phase-modulated continuous wave (PMCW) or other type of radar for generating signal 164.

Aspects of radar sensor 104 may be implemented in circuitry. For instance, radar sensor 104 may include, any one or more of a microprocessor, a controller, a digital signal processor (DSP), an application specific integrated circuit (ASIC), a field-programmable gate array (FPGA), or equivalent discrete or integrated logic circuitry.

Computing device 120 may be configured to receive time-domain or frequency-domain signal 164 from radar sensor 104 and to output indication 168 of an identity of living subject 112. Examples of indication 168 of an identity of living subject 112 may include, but are not limited to, identification number, profile identifier, customer number, user number, or another indication of an identity of living subject 112. Computing device 120 may include computation engine 122. Computation engine 122 may be implemented in circuitry. For instance, computation engine 122 may include, any one or more of a microprocessor, a controller, a digital signal processor (DSP), an application specific integrated circuit (ASIC), a field-programmable gate array (FPGA), or equivalent discrete or integrated logic circuitry.

Computation engine 122 may be configured to generate range and velocity data 166. For example, computation engine 122 may process time-domain or frequency-domain signal 164 to generate range and velocity data 166. In some examples, range and velocity data 166 may indicate motion (e.g., involuntary, voluntary, etc.) by living subject 112 within three-dimensional space 110. In some examples, motion may be subtle. Examples of subtle motion may include, but are not limited to, for instance, a twist in a leg while walking, a raising of a torso while walking, a twist of a wrist while standing, or other subtle motion. Different parts of an object may vary with respect to their range and velocity. For example, different body parts of a human instance of living subject 112 in motion vary in their respective ranges and velocities. This variance is represented in the EM waves 162.

Computation engine 122 may be configured to identify living subject 112. For example, computation engine 122 may identify, based at least on range and velocity data 166 indicating the motion by living subject 112, living subject 112. In this example, computation engine 122 may output an indication 168 of an identity of living subject 112. For instance, computation engine 122 may output a name, identification number, profile number, or other indications of an identity of living subject 112.

Identification system 100 may enable identification of one or more living subjects in a variety of indoor or make-shift environments. Identification system 100 may provide one or more technical advantages, including those of overcoming certain deficiencies in image-based recognition and identification systems that use cameras to obtain images of the living subjects. Such shortcomings of image-based recognition and identification include problems with occlusion, problems arising from poor light conditions, limited information that arises only from the visible features of the subject, etc. Identification system 100 may identify living subjects in a variety of situations, such as but not limited to tracking movements of individuals throughout a home and implementing their preferences for lighting, music, and/or other environmental conditions, monitoring the elderly, monitoring children, tracking the movements of people with Alzheimer's disease, and identifying people in public indoor environments where cameras may not work well. The identification system 100 may output indications of living subject identities to caregivers or security personnel.

Multiple benefits may be realized by implementing the technologies described in this disclosure. In one exemplary benefit, the patterns of how individuals live in their environments may be analyzed; this data may be used to lower the energy consumption, for example. In another benefit, Alzheimer's patients may be tracked within their environments; they may be reminded of where they kept objects such as keys, watches, wallets, etc. In another benefit, an identification system may monitor seniors and provide warnings to caregivers if the seniors experience an adverse event such as a fall. These are only a listing of a few exemplary benefits that may be realized.

It is possible to install cameras or other sensors; while the use of these sensors is not excluded, these other sensors may not work in all conditions, such as poor lighting conditions. The technologies described in this disclosure may work in a variety of different environments and conditions.

Figure 2:
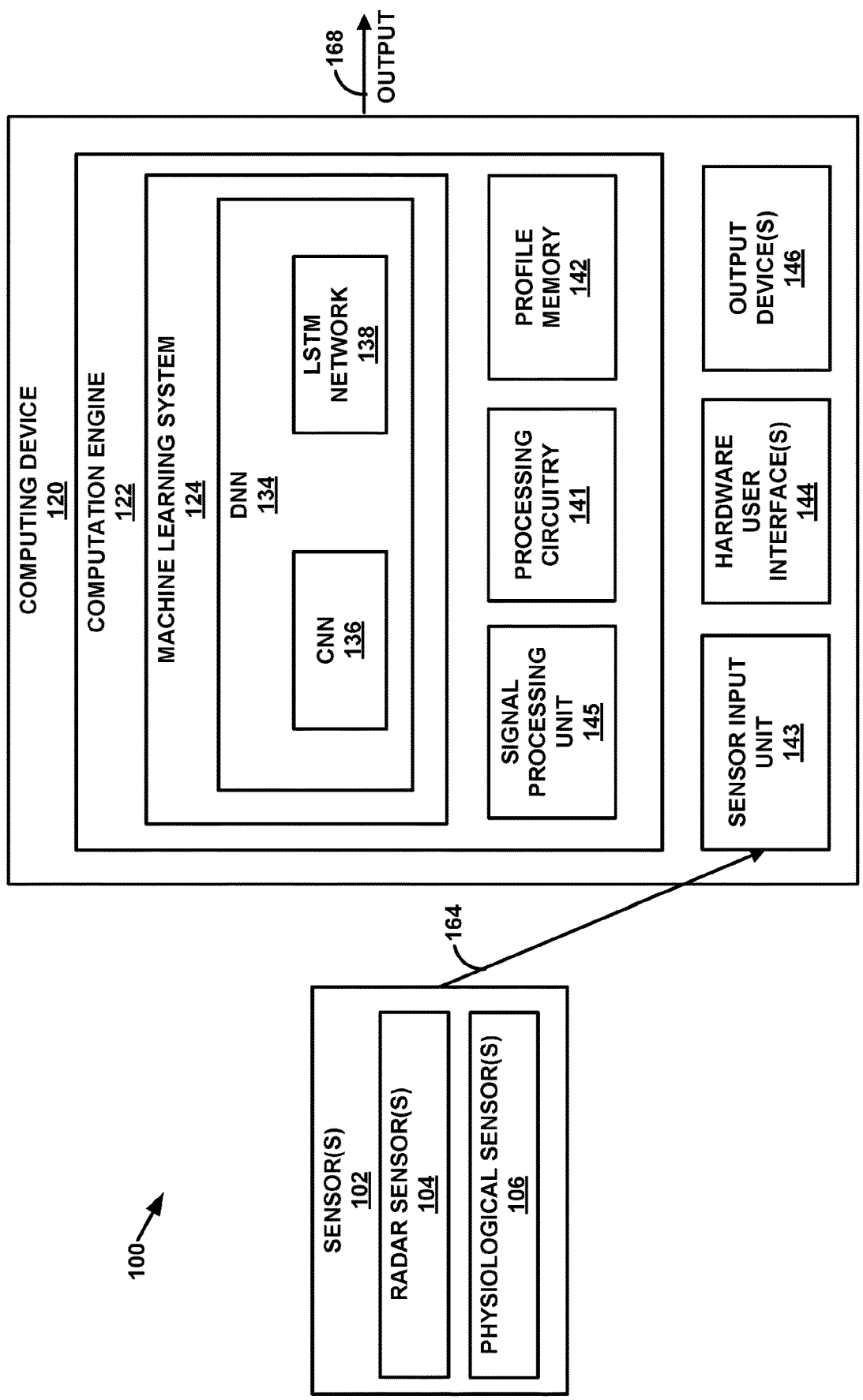
FIG. 2 is a block diagram illustrating an example computing device of the identification system of FIG. 1 in further detail in accordance with the techniques of the disclosure.

FIG. 2 is a block diagram illustrating an example computing device 120 of identification system 100 of FIG. 1 in further detail in accordance with the techniques of the disclosure. In the example of FIG. 2, computing device 120 includes computation engine 122, profile memory 142, sensor input unit 143, signal processing unit 145, processing circuitry 141, one or more hardware user interfaces 144 (hereinafter "hardware user interface 144"), and one or more output devices 146 (hereinafter "output device 146"). In the example of FIG. 2, a user of computing device 120 may provide input to computing device 120 via one or more input devices (not shown) such as a keyboard, a mouse, a microphone, a touch screen, a touch pad, or another input device that is coupled to computing device 120 via one or more hardware user interfaces 144.

Output device 146 may include a display, sound card, video graphics adapter card, speaker, presence-sensitive screen, one or more USB interfaces, video and/or audio output interfaces, or any other type of device capable of generating tactile, audio, video, or other output. Output device 146 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

Computing device 120, in some examples, includes sensor input unit 143. Sensor input unit 143 is configured to receive electrical signal input from one or more sensors, such as sensors 102, and convert the electrical signal input into a form usable by computing device 120. For example, sensor input unit 143 may include software or hardware configured to convert a received signal input from an analog signal to a digital signal. In another example, sensor input unit 143 may include software or hardware configured to compress, decompress, transcode, encrypt, or decrypt a received signal input into a form usable by computing device 120. In another example, sensor input unit 143 may include a network interface device to receive packetized data representative of a time-domain or frequency-domain signal generated by sensor(s) 102. In such examples, an intermediate device may packetize signal 146 to produce the packetized data and send the packetized data to computing device 120. In this manner, sensor input unit 143 may be configured to interface with, or communicate with, one or more sensors that output a time-domain or frequency-domain signal.

Radar sensor 104 may generate time-domain or frequency-domain signal 164. Signal processing unit 145 may obtain the signal 164 received via sensor input unit 143, the signal being at least representative of time-domain or frequency-domain signal 164 generated by sensor(s) 102. Signal processing unit 145 may process the signal to generate range and velocity data 166. Signal processing unit 145 may represent software executable by processing circuitry 141, or a combination of hardware and software. For instance, signal processing unit 145 may include one or more co-processors, such as an Application-Specific Integrated Circuit, for performing Fast Fourier Transforms (FFT) as part of generating the range and velocity data 166.

Computation engine 122 may process range and velocity data 166 using machine learning system 124. Machine learning system 124 may represent software executable by processing circuitry 141, or a combination of hardware and software. Computation engine 122 may process range and velocity data using machine learning system 124 to match a motion by living subject 112 within three-dimensional space 110 to motions of one or more living subjects learned by the machine learning system 124. In some examples, profile memory 142 may store biographical data for different living subjects. In some example, profile memory 142 may store data indicating or representative of motions of one or more living subjects identifiable by the machine learning system 124. For example, such data for a living subject may include time-domain or frequency-domain signal data generated by radar sensor 104 and representative of EM waves reflected from the living subject.

As shown, deep neural network (DNN) 134 may include Convolutional Neural Network (CNN) 136 and Long Short-Term Memory (LSTM) network 138. Computation engine 122 may be configured to apply DNN 134 to range and velocity data 166 to identify living subject 112. For example, computation engine 122 may be configured to apply CNN 136 that learns a feature from range and velocity data 166. In this example, computation engine 122 may be configured to apply LSTM network 138 that learns temporal and dynamic aspects of the feature. In this example, computation engine 122 may identify living subject 112 using a combination of results from both CNN 136 and LSTM network 138. While the example of FIG. 2 uses a DNN, other examples may use other neural networks.

For example, computation engine 122 may use a combination of CNN 136, to featurize data in each sensor frame, followed by LSTM network 138, to integrate the features across time (across multiple frames). In some examples, configuring computation engine 122 to apply the combination of CNN 136 and LSTM network 138 may permit computation engine 122 to recognize living subjects (e.g., people) when their faces are not necessarily visible by using the motion and shape of living subjects as sensed by video, radar (e.g., radar sensor 104), or other sensor. In some examples, configuring computation engine 122 to use a time-domain or frequency-domain signal may permit computation engine 122 to use the time-domain or frequency-domain signal directly without masking because the time-domain or frequency-domain signal may be obscure personal data of living subject 112 without applying foreground masking of living subject 112 to remove personal information. As such, computation engine 122 may be used in various application, for example, but not limited to, security, forensics, human interaction, health monitoring in the home, and other applications.

Although described as being implemented using a DNN in the example of FIG. 2, machine learning system 124 may apply other types of machine learning to train one or more models capable of identifying living subjects. For example, machine learning system 124 may apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train one or more models for identifying living subject.

In some examples, signal processing unit 145 may generate range and velocity data 166 as a sequence of frames (e.g., first two-dimensional range-doppler image 172 of FIG. 3B, second two-dimensional range-doppler image 174 of FIG. 4B, and third two-dimensional range-doppler image 176 of FIG. 5B). For each frame, computation engine 122 may apply CNN 136 to generate a sequence of feature vectors, one from each frame, and then apply LSTM network 138 to this sequence of feature vectors to generate a final, integrated feature vector that may be used to identify the subject. Computation engine 122 may use the final feature vector to identify the sensed subject by comparing the final feature vector to previously captured output feature vectors of the same subject (e.g., living subject 112). The comparison may be made by computing thresholded normalized inner products of the vectors, for example. Prior to use, computation engine 122 may train CNN 136 and LSTM network 138 with a suitable training set of previously generated range and velocity data involving a number of different training subjects. These training subjects may be different from the living subjects for which system 100 is deployed to identify.

Identification system 100 may include one or more sensors 102 (hereinafter "sensors 102). In some examples, sensors 102 may be contactless sensors that are configured to generate sensor data without contacting living subject 112. Sensors 102 may include radar sensor 104 and one or more physiological sensors 106 (hereinafter "physiological sensor 106"). Physiological sensor 106 may receive physiological data indicating one or more physiological characteristics of living subject 112. Examples of physiological data may include, but are not limited to, electrocardiography (ECG), respiratory signals, or other physiological data. In this example, computation engine 122 may be configured to receive the physiological data, and identify living subject 112 based at least on the one or more physiological characteristics of the living subject and range and velocity data 166 indicating the motion by living subject 112.

Computation engine 122 may determine, based on profile data stored at profile memory 142 for one or more living subjects, biographical data for living subject 112. Examples of biographical data may include, but are not limited to, a name, title, patient number, or other biographical data. In some examples, computation engine 122 may output indication 168 of an identity of living subject 112 to include the biographical data.

Computation engine 122 may determine tracking information. Tracking information may include an indication of a location of one or more living subjects within three-dimensional space 110. As used herein, a location may refer a range from radar sensor 104. For example, computation engine 122 may determine one or more rooms of three-dimensional space 110 that living subject 112 has occupied based on range and velocity data 166. In this example, computation engine 122 may generate tracking information indicating a room of three-dimensional space 110 that living subject 112 has occupied. In some examples, computation engine 122 may output indication 168 of an identity of living subject 112 to include the tracking information.

Computation engine 122 may determine activity information. Activity information may include an indication of an activity being performed of living subject 112 within three-dimensional space 110. The activity may be voluntary (e.g., a hand wave or walk) or involuntary (e.g., a fall). For example, computation engine 122 may process the time-domain or frequency-domain signal to generate the range and velocity data to include data indicative of a motion of living subject 112. Examples of a motion of living subject 112 may include, but are not limited to, a motion of a head of living subject 112, a motion of an arm of living subject 112, a motion of a leg of living subject 112, a motion of a torso of living subject 112, or another motion. Such motions may correspond to activities performed by the living subject 112. In some examples, computation engine 122 may output indication 168 of an identity of living subject 112 to include the tracking information that indicates one or more activities performed by living subject 112. In various example, computation engine 122 may be configured to identify an activity performed by a living subject, identify an identity of a living subject, or identify both an activity performed by and the identity of a living subject.

Computation engine 122 may determine passive training information for training machine learning system 124. In some examples, the passive training information may indicate identification data for living subject 112. In some examples, the identification data may be descriptive of one or more activities of the living subject. Examples of activities may include, but are not limited to, gait, running, posture while walking, dancing, or another activity. For example, computation engine 122 may determine that living subject 112 has performed a particular activity (e.g., jogging) based on range and velocity data 166. In this example, computation engine 122 may generate passive training information that indicates motion of living subject 112 while performing the particular activity. For instance, computation engine 122 may generate passive training information that indicates a gait of living subject 112 while jogging. In some examples, computation engine 122 may output indication 168 of an identity of living subject 112 to include the passive training information for training machine learning system 124.

Computation engine 122 may be configured to map object 113 located within three-dimensional space 110 based on an interaction of living subject 112 with object 113. For example, computation engine 122 may determine that living subject 112 has interacted (e.g., tossing, rolling, compressing, etc.) with object 113 based on range and velocity data 166. In this example, computation engine 122 may map object 113 within three-dimensional space 110.

In this way, identification system 100 may provide reliable identification of living subject 112. For example, identification system 100 may identify living subject 112 out of a small set of individuals (e.g., a family). In some examples, identification system 100 may identify living subject 112 during normal activities such as walking, sitting and standing. In some examples, identification system 100 may pre-enroll living subjects. In some examples, identification system 100 may evaluate an impact on identification when two living subjects are present, where one living subject is enrolled and the other living subject is not enrolled.

In some examples, computation engine 122 may be robust to a presence and/or motion of objects in addition to living subject 112. For example, three-dimensional space 110 may include object 113. In this example, identification system 100 may accurately identify living subject 112 regardless of the presence and/or a motion of object 113. More specifically, for example, range and velocity data 166 may indicate object 113. In this example, computation engine 122 may accurately identify living subject 112 based on range and velocity data 166. For instance, machine learning system 124 may accurately identify living subject 112 regardless of the presence and/or motion of object 113.

FIG. 3A is a conceptual diagram illustrating motion of living subject 112 at a first time in accordance with the techniques of the disclosure. In the example of FIG. 3A, motion by living subject 112 corresponds to a standing activity performed by living subject 112 while living subject 112 is at a position within three-dimensional space 110 that is relatively far from radar sensor 104.

FIG. 3B is a conceptual diagram illustrating range and velocity data 166 for the motion of living subject 112 illustrated in FIG. 3A in accordance with the techniques of the disclosure. The abscissa axis of FIG. 3B indicates a velocity of objects within three-dimensional space 110 and the ordinate axis indicates a range of objects within three-dimensional space 110. For example, a position of peak 170 along the abscissa axis of FIG. 3B may indicate a velocity of living subject 112 and a position of peak 170 along the ordinate axis of FIG. 3B may indicate a range of living subject 112 from radar sensor 104 at the first time. Various peaks in two-dimensional range-doppler images 172, 174, and 176 may correspond to parts of the living subject 112, such as the body, hands, arms, feet, legs, and head. Other peaks of FIG. 3B may represent one or more objects and/or a background of three-dimensional space 110 in some instances.

Computation engine 122 may process time-domain or frequency-domain signal 164 to generate range and velocity data 166 as a first two-dimensional range-doppler image 172 at the first time. Each of two-dimensional range-doppler images 172, 174, 176 may represent a defined period of time, such as 100 μs, during which signal is received from sensor 104.

FIG. 4A is a conceptual diagram illustrating motion of living subject 112 at a second time in accordance with the techniques of the disclosure. In the example of FIG. 4A, motion by living subject 112 corresponds to a walking activity performed by living subject 112 while living subject 112 is at a position within three-dimensional space 110 that is moderately close to radar sensor 104.

FIG. 4B is a conceptual diagram illustrating range and velocity data 166 for the motion of living subject 112 illustrated in FIG. 4A in accordance with the techniques of the disclosure. The abscissa axis of FIG. 4B indicates a velocity of objects within three-dimensional space 110 and the ordinate axis indicates a range of objects within three-dimensional space 110. For example, a position of peak 170 along the abscissa axis of FIG. 4B may indicate a velocity of living subject 112 and a position of peak 170 along the ordinate axis of FIG. 4B may indicate a range of living subject 112 from radar sensor 104 at the second time. Other peaks of FIG. 3B may represent one or more objects and/or a background of three-dimensional space 110 in some instances.

Computation engine 122 may process time-domain or frequency-domain signal 164 to generate range and velocity data 166 as a second two-dimensional range-doppler image 174 at the second time.

FIG. 5A is a conceptual diagram illustrating motion of living subject 112 at a third time in accordance with the techniques of the disclosure. In the example of FIG. 5A, motion by living subject 112 corresponds to a standing activity performed by living subject 112 while living subject 112 is at a position within three-dimensional space 110 that is close to radar sensor 104.

FIG. 5B is a conceptual diagram illustrating range and velocity data 166 for the motion of living subject 112 illustrated in FIG. 5A in accordance with the techniques of the disclosure. The abscissa axis of FIG. 5B indicates a velocity of objects within three-dimensional space 110 and the ordinate axis indicates a range of objects within three-dimensional space 110. For example, a position of peak 170 along the abscissa axis of FIG. 5B indicates a velocity of living subject 112 and a position of peak 170 along the ordinate axis of FIG. 5B indicates a range of living subject 112 from radar sensor 104 at a third time. Other peaks of FIG. 5B may represent one or more objects and/or a background of three-dimensional space 110 in some instances.

Computation engine 122 may process time-domain or frequency-domain signal 164 to generate range and velocity data 166 as a third two-dimensional range-doppler image 176 at the third time.

Although only three range-doppler images 172, 174, and 176 are illustrated in the FIGS. 3B, 4B, 5B, computing device 120 may generate many more such images in a similar fashion by processing signal 164 received from a radar sensor 104 in the manner described above. Multiple range-doppler images represent an example of range and velocity data as described herein and may be used to train machine learning system 124 and for identifying living subjects by the machine learning system 124 of computing device 120.

For example, multiple range-doppler images may be processed serially (e.g., in the order of the time represented by the images) to train machine learning system 124 to learn correlate movement of one or more peaks, such as peak 170, across the series of radar-doppler images to a movement of a living subject 112. As seen in FIGS. 3A-3B, 4A-4B, and 5A-5B, for instance, the particular movement of peak 170 may correspond to the movement of the arm, leg, head, other part, or the entirety of living subject 112. By training machine learning system 124 with the range-doppler images known to be associated with living subject 112, the machine learning system 124 may obtain a model that is usable for subsequently identifying living subject 112 when processing subsequent radar-doppler images. Again, with respect to peak 170, if a series of subsequent range-doppler images has a peak similar to peak 170 and the peak moves across the series of radar-images in a manner similar to the movement of peak 170 across images 172, 174, and 176, machine learning system 124 can identify living subject 112 based on this similarity, where the movement of the peaks indicate a gait, motion, or other physical movement typical of the living subject 112.

By training the machine learning system 124 using multiple series of radar-doppler images generated based on time-domain or frequency-domain signals reflected from multiple living subjects, the machine learning system 124 may be trained to distinguish the multiple living subjects from one another by subsequently matching a series of subsequent radar-doppler images to one of the multiple series of radar-doppler images on which machine learning system 124 has been trained. Machine learning system 124 may output an indication of the identity of the living subject 112 having the matching series of radar-doppler images.

In some examples, computation engine 122 may match the one or more activities (e.g., standing) performed by living subject 112 to one of multiple different activities for one or more living subjects learned by machine learning system 124. For instance, computation engine 122 may match a position of peak 170 (and other positions of peak 170 over a period of time) to learned activities for one or more living subjects.

Consequently, an accuracy of computation engine 122 to identify living subject 112 may exceed that of vision-based identification systems.

Figure 6:
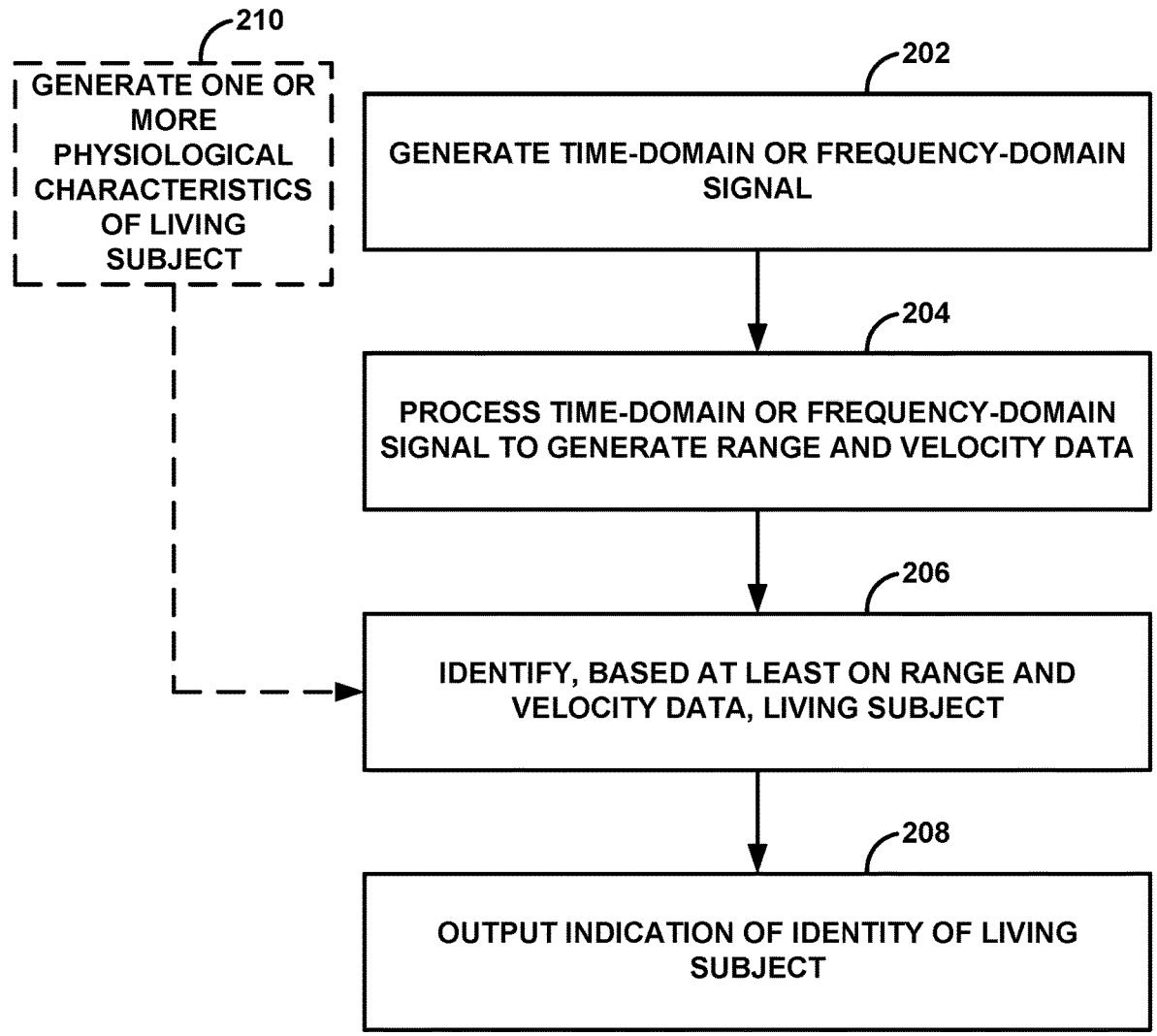
FIG. 6 is a flowchart illustrating an example method for identification in accordance with the techniques of the disclosure.

FIG. 6 is a flowchart illustrating an example method for identification in accordance with the techniques of the disclosure. The example of FIG. 6 is described with respect to identification system 100 of FIG. 1. However, the example operation may be performed by other systems that implement the techniques of the disclosure.

In the example of FIG. 6, radar sensor 104 generates time-domain or frequency-domain signal 164 (202). Upon receiving the time-domain or frequency-domain signal 164, computation engine 122 processes time-domain or frequency-domain signal 164 to generate range and velocity data 166 (204). In some examples (as indicated by the dashed lines for operation 210), physiological sensor 106 may generate one or more physiological characteristics of the living subject (210). In any case, computation engine 122 identifies, based at least on range and velocity data 166 and using a trained model, living subject 112 (206). For example, computation engine 122 may identify, based on only range and velocity data 166, living subject 112. In some examples, computation engine 122 may identify, based on range and velocity data 166 and one or more physiological characteristics of living subject 112, living subject 112. In any case, computation engine 122 outputs an indication of an identity of living subject 112 (208).

Figure 7:
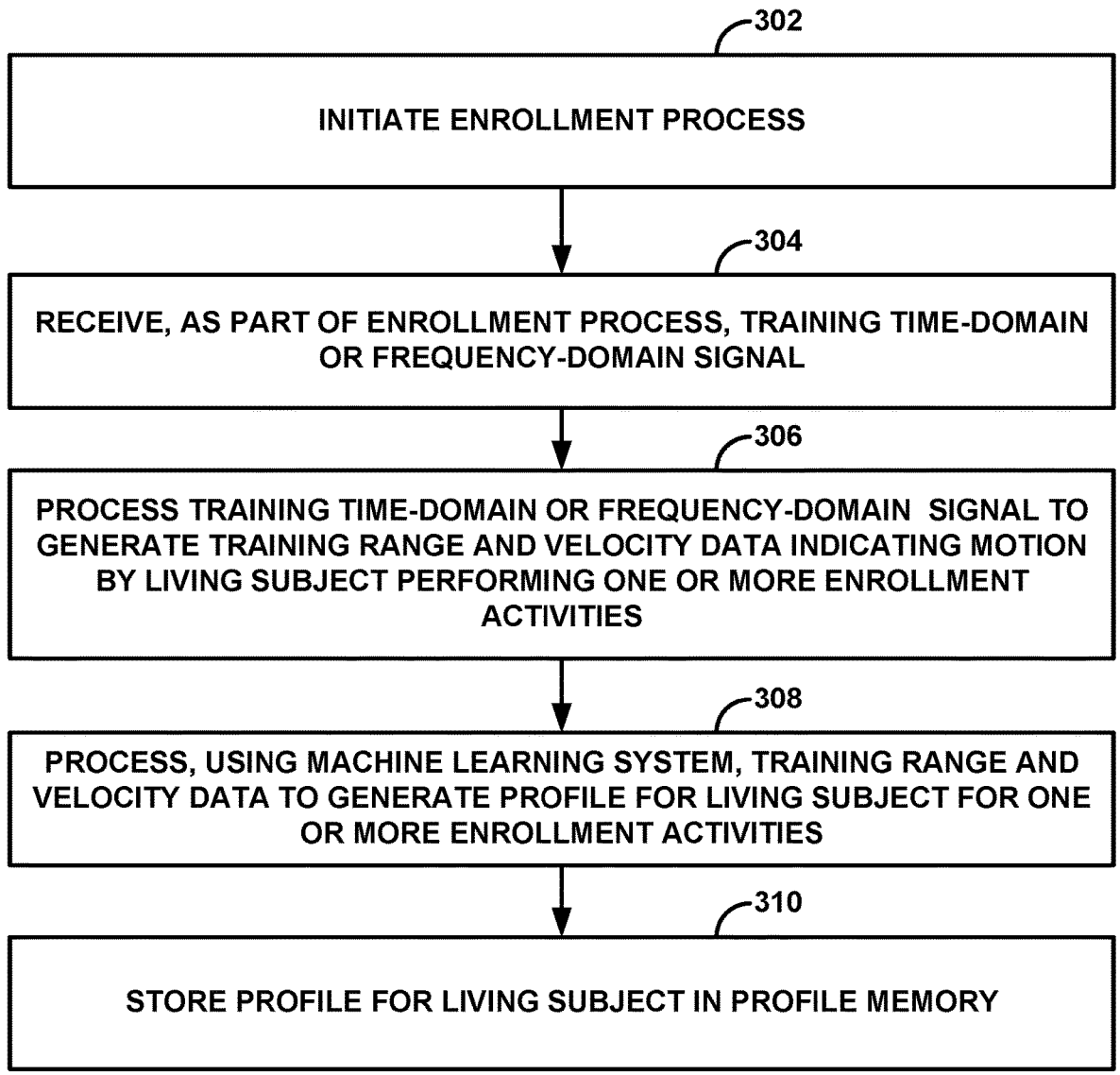
FIG. 7 is a flowchart illustrating an example enrollment process in accordance with the techniques of the disclosure.

FIG. 7 is a flowchart illustrating an example enrollment process in accordance with the techniques of the disclosure. The example of FIG. 7 is described with respect to identification system 100 of FIG. 1. However, the example operation may be performed by other systems that implement the techniques of the disclosure.

In the example of FIG. 7, computation engine 122 initiates an enrollment process (302). For example, computation engine 122 may initiate the enrollment process by causing hardware user interface 144 to output a challenge to living subject 112 to perform the one or more enrollment activities. Examples of a challenge may include, but are not limited to, walking, running, standing, raising a hand, moving an arm, moving a leg, moving a torso, or another challenge. In some examples, computing device 120 computation engine 122 may initiate the enrollment process in response to determining that profile memory 142 does not store a profile for living subject 112 and that living subject 112 is to perform the one or more enrollment activities.

Computation engine 122 receives, as part of the enrollment process, training time-domain or frequency-domain signal 164 (304). Computation engine 122 processes training time-domain or frequency-domain signal 164 to generate training range and velocity data 166 indicating motion by living subject 112 performing one or more enrollment activities (306). Computation engine 122 processes, using machine learning system 124, training range and velocity data 166 to generate a profile for living subject 112 for one or more enrollment activities (308). Computation engine 122 may store a profile for living subject 112 in profile memory 142 (310).

Figure 8:
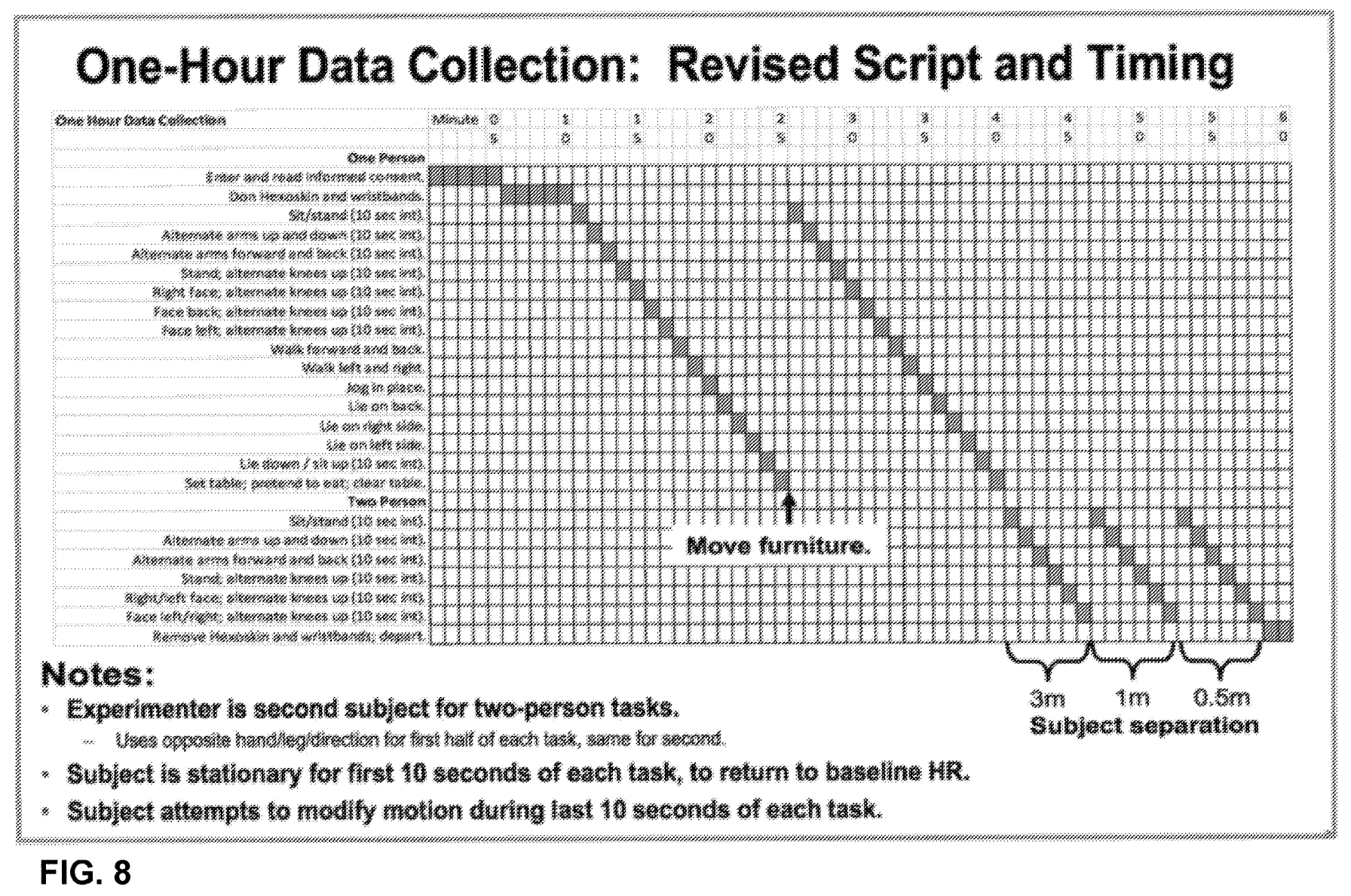

FIG. 8 is a conceptual diagram illustrating various challenge activities for an individual for collecting training range and velocity data for identification, in accordance with the techniques of the disclosure. FIG. 8 illustrates an exemplary script and timing table for a one-hour data collection.

FIG. 9 is a conceptual diagram illustrating data sequences for identification in accordance with the techniques of the disclosure. For example, FIG. 9 illustrates various activities, such as, for example, walking forward and back up, walk to and fro, jog to and fro, with one or multiple human subjects. In this example, each activity is assigned an activity key and a sequence number.

FIG. 10 is a conceptual diagram illustrating data grouping for analysis in accordance with the techniques of the disclosure. In the example of FIG. 10, 'T' denotes training data, V denotes validation data. In this example, training and validation data is non-overlapping, although they may be from the same sequence (although different parts).

In some examples, to train the model, computation engine 122 may split data into training and validation sets in different ways that are referred to herein as "splits." The training and validation data in each split may be non-overlapping and may be drawn from the same sequence, albeit from different parts. In FIG. 10, "walk1-*a*" refers to training data drawn from sequences 9, 10, 11 and the validation data from 26, 27, 28. In FIG. 10, "walk1-*b*" refers to the training data is drawn from sequences 26, 27, 28 and the validation data from 9, 10, 11. The sequences may be identified with reference to FIG. 9. For example, sequence 9 corresponds to "walk forward and back up" in FIG. 9. In FIG. 10, "walk1-mix" refers to the training data that is drawn from walk1-*a* and the validation data from walk1-*b* of each of the following sequences: 9, 10, 11, 26, 27, 28. In FIG. 10, "walk2-mix" refers to training data that is drawn from the walk1-*a* and the validation data from the walk1-*b* of each of the following sequences: 9, 10, 11, 15, 16, 17, 26, 27, 28. Said differently, walk2-mix is walk1-mix with additional data (of two-person activities).

FIG. 11 is a conceptual diagram illustrating results for identification with a single person in a room in accordance with the techniques of the disclosure. As shown in FIG. 11, one or more techniques described herein has an overall accuracy of over 0.99 or 99%. In this example, the results may be affected by computation engine 122 learning clues in the background of a three-dimensional space.

In the example of FIG. 11, computation engine 122 may convert a floating point image to an 8-bit image. For examples, the range-doppler image may be a floating point image whose range is approximately [0; 18000]. In this example, computation engine 122 may convert the floating point image to 8-bit image for use by DNN 134 by, for example, clipping to maxval and scaling the image to [0; 255]. As shown in FIG. 11, Maxval may be 5,000. Given that most of the changes in the image occur in the range [0; 2000], various examples described herein explore clipping the image using different values for maxval (e.g., 2000, 3000, 4000, 5000, 6000, etc.).

FIG. 12A is a conceptual diagram illustrating results for identification with a single person in a room with background removal in accordance with the techniques of the disclosure. FIG. 12A illustrates a validation accuracy for single person experiments using images with the background removed. In the example of FIG. 12A, the first column represents the different experiments (e.g., E1, . . . , E3).

In the example of FIG. 12A, computation engine 122 is configured to subtract the background such that machine learning system 124 is configured to train on living subject 112. In this example, computation engine 122 has a performance of over 99% (Walk1-mix).

FIG. 12A illustrates that using radar sensor 104 and one or more techniques described herein for identification of a living subject. In some examples, computing device 120 may be configured to identify, using one or more techniques described herein, the correct person out of five subjects over 85% of the time in 5 out of the 6 splits when the person is performing a novel walk in front of the radar (e.g., a walk not seen before by the system). In this example, five possible subjects are used resulting in a chance selection of 20% and after taking care to subtract out the background that may have unique features related to experiment artifacts. The exemplary assignment was tested with different types of walks: forwards, backwards, and rushed.

For example, in some examples to identify the subject irrespective of the background which is static, computation engine 122 may remove the background from the range-doppler image by, for example, subtracting a background image from each range-doppler image. In some implementations, the subjects (e.g., living subject 112) are dynamic and move around in the image. As such, computation engine 122 may use a median image for each sequence as the background image for that sequence as shown in FIG. 12B.

Figure 12B:
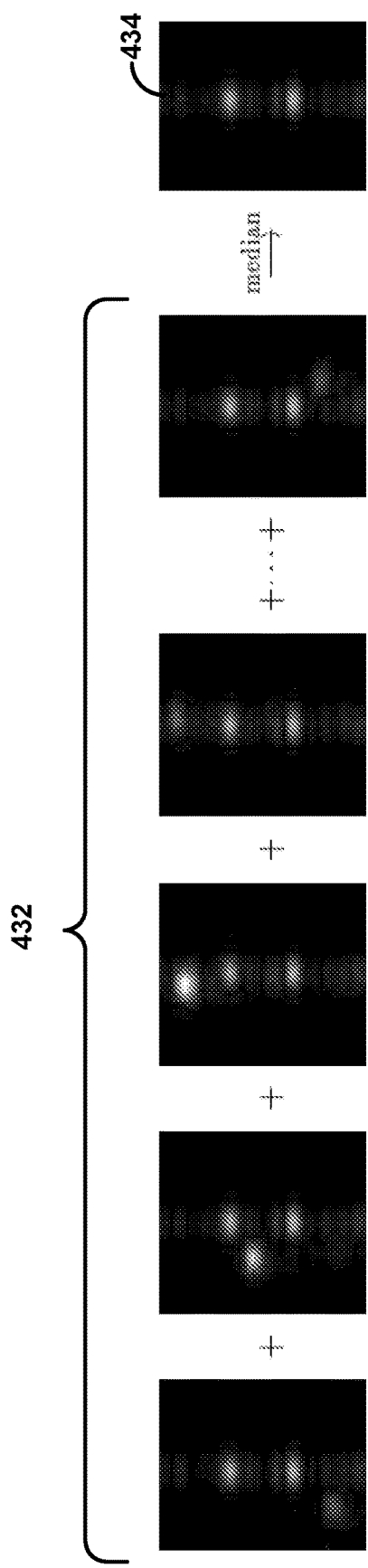
FIG. 12B is a conceptual diagram illustrating background removal in accordance with the techniques of the disclosure.

FIG. 12B is a conceptual diagram illustrating background removal in accordance with the techniques of the disclosure. In the example of FIG. 12B, computation engine 122 computes a median of regularly sampled images from the sequence from images shown in sequence 432 to generate background image 434. In this way, computation engine 122 may generate background image 434 to remove the background image from the range-doppler image as described in FIG. 12A.

FIG. 13 is a conceptual diagram illustrating results for identification with two persons in a room in accordance with the techniques of the disclosure. In the example of FIG. 13, computation engine 122 is configured to subtract the background such that machine learning system 124 is configured to train on living subject 112 and another living subject. In this example, computation engine 122 has a performance of over 99% (Walk2-mix*). In the example of FIG. 13, computation engine 122 may use the model obtained from walk1-mix split as a starting point for walk2-mix*.

FIG. 14 is a conceptual diagram illustrating prediction on validation data and novel data in accordance with the techniques of the disclosure. In the example of FIG. 14, subset 450 indicates prediction novel sequences.

FIG. 14 illustrates (e.g., sequences 15-17, walk1-mixavg) results for training identification system 100 using only examples of single subjects in the room. As shown, identification system 100, when implemented one or more techniques described herein, correctly recognizes the same subjects 88% percent of the time when another person is also present in the room and moving close to the subject. When identification system 100 has been trained on all data (e.g., single and two-person data), the resulting accuracy is over 99% on validation data.

FIG. 14 illustrates a model prediction accuracy (as a percentage) on different sequences when trained on different splits. The accuracy in the walk1-mix and walk2-mix+ columns was determined by obtaining N=10 samples from the validation portion of each sequence per subject. Each row is therefore estimated using 50 samples across all subjects. The sequences 15, 16, 17 are completely novel for the walk1-mix model and the reasonably good accuracy for these sequences indicates that a model trained on single subjects is able to do well when there are two subjects in the room (e.g., three-dimensional space 110). For the walk1-mixavg column, 10 samples per sequence was averaged before deciding the identity of the subject (e.g., living subject 112).

Figure 15:
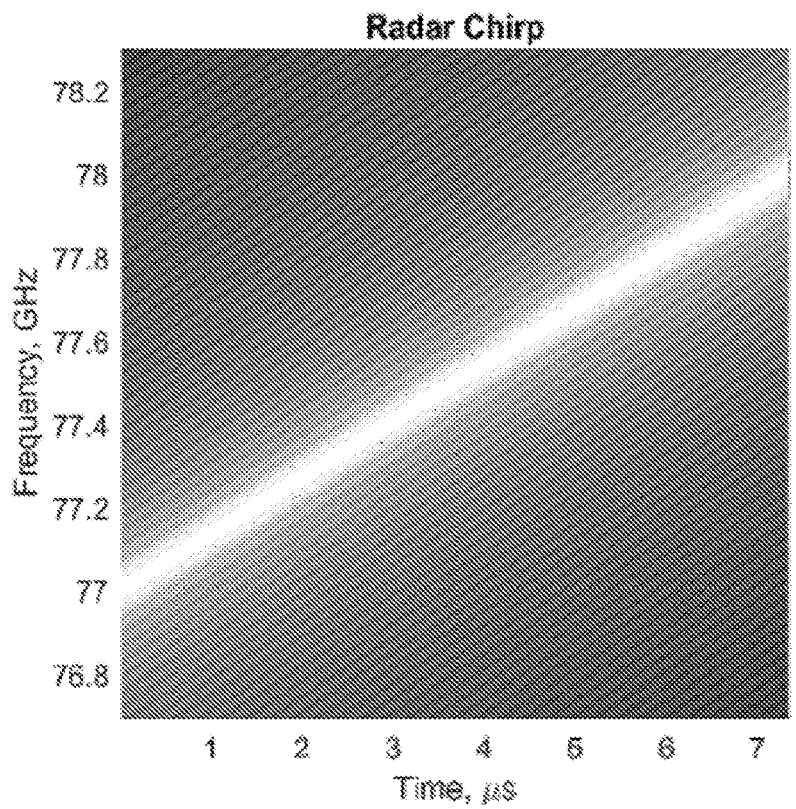
FIG. 15 is a diagram illustrating a radar chirp in accordance with the techniques of the disclosure.

FIG. 15 is a conceptual diagram illustrating a radar chirp in accordance with the techniques of the disclosure. The abscissa axis represents time in microseconds and the ordinate axis represents frequency in Gigahertz.

In some examples, radar sensor 104 may be Frequency-Modulated Continuous-Wave (FMCW) type. Radar sensor 104 may encode information by modulating the frequency of a carrier wave. In examples where radar sensor 104 is FMCW type, a 77 gigahertz (GHz) signal may be mixed with a 1 GHz linear chirp signal, creating a 77 GHz-78 GHz chirp pulse as shown in FIG. 15.

Figure 16:
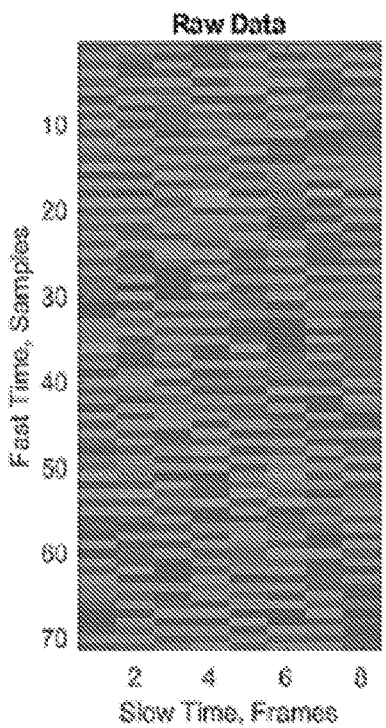
FIG. 16 is a diagram illustrating raw data in the form of a time-domain signal obtained in multiple frames, in accordance with the techniques of the disclosure.

FIG. 16 is a diagram illustrating raw data in the form of a time-domain signal obtained in multiple frames, in accordance with the techniques of the disclosure. The abscissa axis represents slow time in frames and the ordinate axis represents fast time in samples.

When the modulated chirp (e.g., the radar chirp illustrated in FIG. 15) echoes off a target and is received, the modulated chirp is mixed back down to baseband, leaving a time-domain signal whose fundamental frequency is a function of the distance the chirp travels (FIG. 16, "Raw Data").

Figure 17:
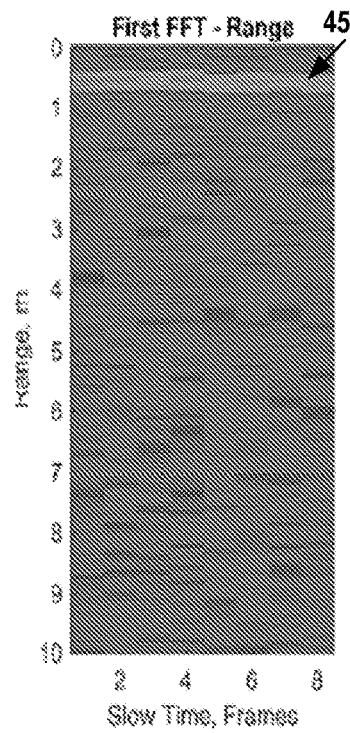
FIG. 17 is a diagram illustrating range data in accordance with the techniques of the disclosure.

FIG. 17 is a diagram illustrating range data in accordance with the techniques of the disclosure. The abscissa axis represents slow time in frames and the ordinate axis represents range in meters.

Because the instantaneous frequency of a received pulse of FIG. 16 corresponds to range, computation engine 122 may apply a Fast-Fourier Transform (FFT) to the "Fast Time" samples of FIG. 16 extracted from the pulse; this gives an indication of range by the peak frequency (FIG. 17, "First FFT"). After the range information is extracted from a single pulse (sometimes called a "frame"), several of these pulses are aggregated in "Slow Time," giving an indication of the target's location over several pulse intervals. In FIG. 17, target 452 has a range of approximately 0.5 meters.

Figure 18:
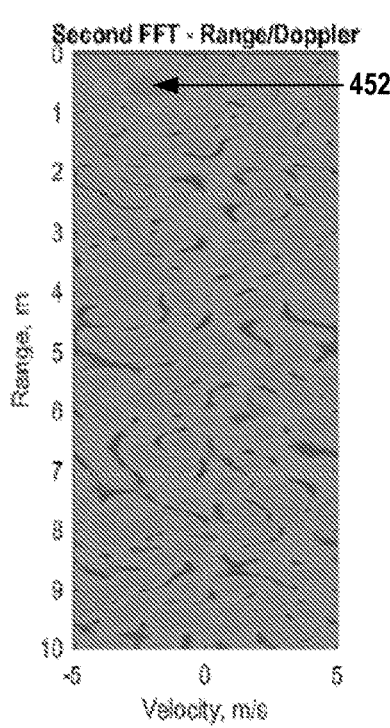
FIG. 18 is a diagram illustrating range and velocity data in accordance with the techniques of the disclosure.

FIG. 18 is a conceptual diagram illustrating range and velocity data in accordance with the techniques of the disclosure. The abscissa axis represents velocity in meters per second and the ordinate axis represents range in meters.

Computation engine 122 may perform a second FFT in each "range bin" of the aggregated first FFT pulses, and the location of the resulting peak corresponds to target range and velocity (FIG. 18, "Second FFT"). In FIG. 18, target 452 is moving away from radar sensor 104 at approximately 3 meters per second negative velocity, shown in the left half of the panel, indicates motion away from the radar.

Figure 19:
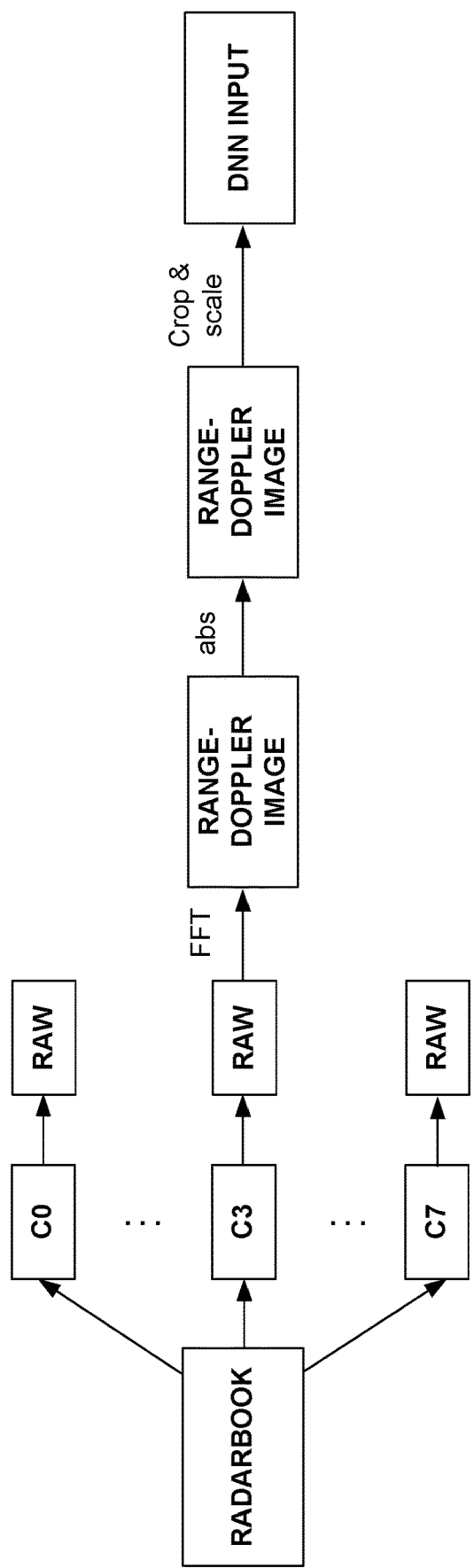
FIG. 19 is a block diagram illustrating an example processing pipeline to obtain a scaled and cropped range-doppler image from radar data in accordance with the techniques of the disclosure.

FIG. 19 is a block diagram illustrating an example processing pipeline to obtain a scaled and cropped range-doppler image from radar data in accordance with the techniques of the disclosure. Computation engine 112 may perform operations of the processing pipeline. C0-C7 represent different radar channels that generate corresponding raw time-domain or frequency-domain signal and that may be used to extract more detailed features of the subjects to improve the detection performance. In this example pipeline, computation engine 112 applies one or more FFTs to the raw data from each of the channels to generate corresponding range-doppler images (or "range-doppler maps") using signal received as a result of one or more radar frames each corresponding to a single radar pulse or chirp.

FIG. 20 is a conceptual diagram illustrating an example range doppler image 460 along with a region of interest in accordance with the techniques of the disclosure. In some examples, computation engine 122 may crop range doppler image 460 to generate region of interest 462.

FIG. 21 is a conceptual diagram illustrating an example cropped range doppler image obtained from a region of interest 462 and used in a machine learning system, DNN 134, in accordance with the techniques of the disclosure. For example, computation engine 122 may apply DNN 134 to region of interest 462, for instance, for multiple different range-doppler images. The region of interest 462 may remain constant in some cases.

Figure 22:
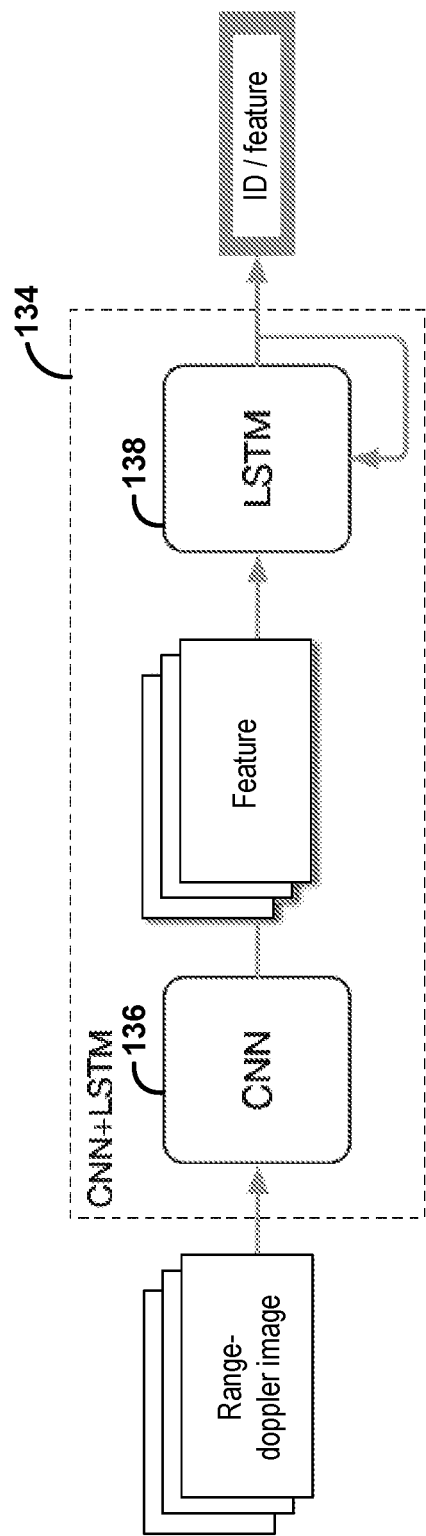
FIG. 22 is a block diagram illustrating an overview of a machine learning system that processes range-doppler images to identify a living subject in accordance with the techniques of the disclosure.

FIG. 22 is a block diagram illustrating an overview of a machine learning system, DNN 134 (including CNN 136 and LSTM network 138), that processes range-doppler images to identify a living subject in accordance with the techniques of the disclosure.

In the example of FIG. 22, DNN 134 includes CNN 136 and LSTM network 138 in order to learn the features of each subject (e.g., living subject 112). In some examples, CNN 136 may learn a feature from each range-doppler image. In some examples, LSTM network 138 may learn the temporal and dynamic aspects of the feature. In some examples, LSTM network 138 may use a sequence of 20 frames.

Figures 23, 24:
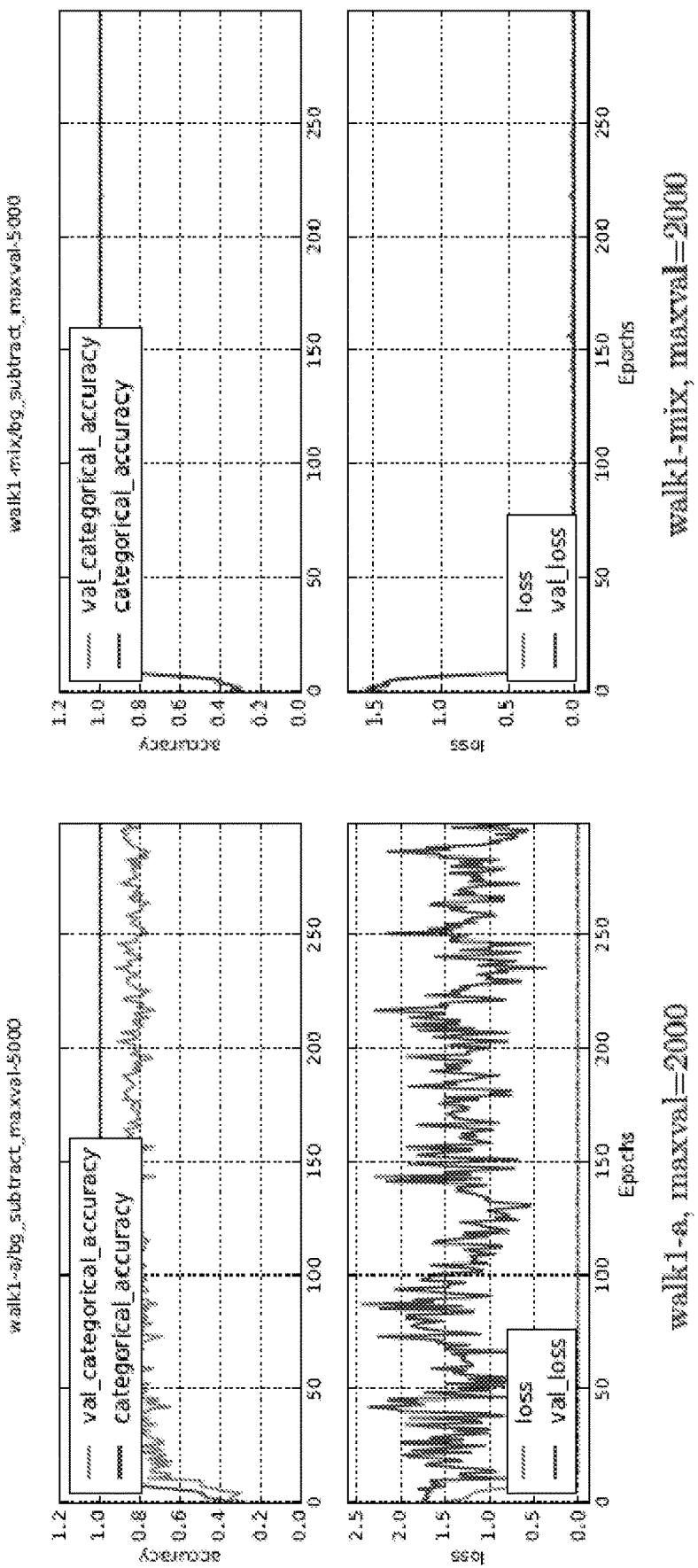
FIG. 23 is a conceptual diagram illustrating a training process for a first split with a background removed in accordance with the techniques of the disclosure.
FIG. 24 is a conceptual diagram illustrating a training process for a second split with a background removed in accordance with the techniques of the disclosure.

FIG. 23 is a conceptual diagram illustrating a training process for a first split with a background removed in accordance with the techniques of the disclosure. The abscissa axis of FIG. 23 represents epochs and the ordinate axis represents a loss (bottom) and accuracy (top).

FIG. 24 is a conceptual diagram illustrating a training process for a second split with a background removed in accordance with the techniques of the disclosure. The abscissa axis represents epochs and the ordinate axis represents loss (bottom) and accuracy (top).

Example Automotive Identification Use Cases

Wideband radar sensors may be built into vehicles for driving use cases, such as, for example, advanced driver assistance systems (ADAS), autonomous driving, and other driver assistance systems. One or more techniques described herein for using radar for biometric identification of a person may be applied for driving use cases. For example, identification system 100 may record a person's body shape and movement patterns to perform the identification using one or more techniques described herein.

By using one or more techniques described herein for the radar biometric capability in connection with the key fob activation function, computation engine 122 may be configured to distinguish between different members of a household. For example, when key fob 1 is used, computation engine 122 may determine if the driver is Alice or Bob. If Fob 1 is permanently linked to Alice, but Bob is borrowing Fob 1, then personalized internal cabin comfort preferences (such as climate control, seat, navigation, entertainment, etc.) may be loaded for Bob's settings (not Alice's) while Bob is approaching the vehicle, and may be fully personalized and activated upon vehicle entry.

In some examples, computation engine 122 may be configured to distinguish between a household member and non-household member. For security purposes, the identification of a non-household member could be used to restrict access or use of the vehicle. There are some instances where highly restricted access would apply (e.g., such as a thief who obtains the fob, or who clones the fob signal). There are other instances, where an authorized user, such as a parking valet, would obtain limited access to the vehicle. It should be noted that low cost devices such as RollJam may permit hackers to gain access to vehicles. Requiring a second authentication factor, in case the fob is compromised, may increase security and prevent theft or vandalism.

In some examples, computation engine 122 may be configured for automatic car door or trunk opening and closing. There are instances in everyday vehicle use where the vehicle operator's hands are full and it would be convenient to open a door or trunk for them (e.g., such as when they are carrying packages, or a young child or baby). A fob is good for identification and access, but it is not capable of determining of the approaching driver needs automatic door or trunk assistance. Because radar may perform activity recognition in addition to biometric identification, computation engine 122 may be configured to determine when the vehicle owner's activity (e.g., carrying packages, baby or young child, etc.) would be useful. By employing activity recognition, it would be an additional convenience feature for the car door to open as they approach. In addition to the fob, the radar biometric would serve as a second authentication factor.

In some examples, computation engine 122 may be configured for emergency access when fob locked in car and/or for prevention of locking Fob in car. The incidence of locking a fob in a car is prevalent among owners of cars with keyless entry systems. By using radar biometric, computation engine 122 may authenticate the household member and grant access to the vehicle. In addition, computation engine 122 may help prevent the key fob being locked in the vehicle by sensing the owner walking away when the fob remains in the vehicle, and sound an alarm or send a notification.

In some examples, computation engine 122 may be configured for an advanced theft alarm. The external radar may provide an extra ring of protection. By enabling the radar. Computation engine 122 may sense "non-owner" presence for the purpose of identifying suspicious activity. If a stranger approaches the car and is peeping inside the car, walking around it for a prolonged time period, then this can information can be used by the car to send a notification to the driver, or to enable cameras for recording purposes, or take other actions that protect the vehicle from theft or vandalism.

Figure 25:
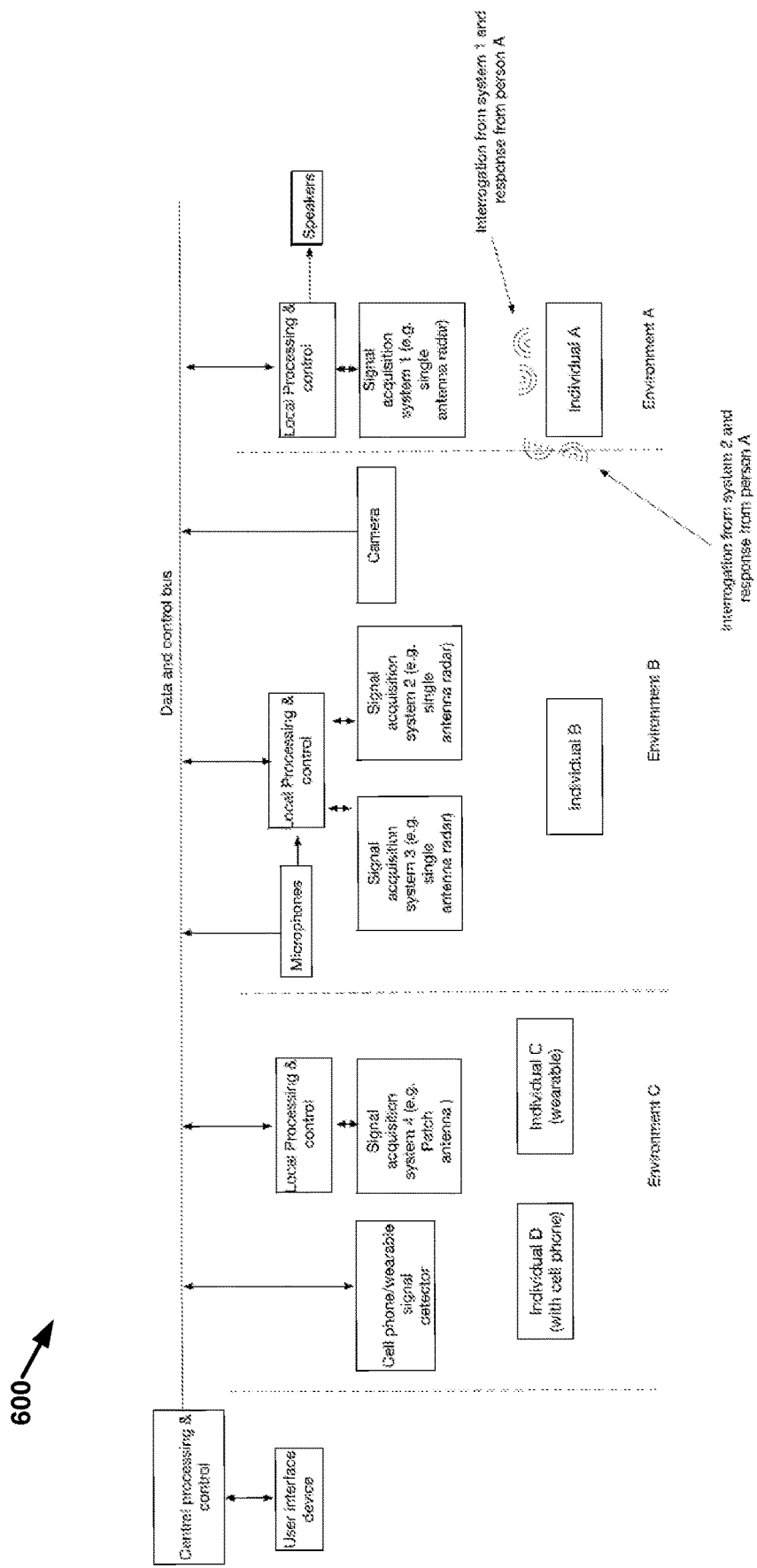
FIG. 25 illustrates one configuration of example identification system, in the form of a data acquisition and analysis system (DAAS) that may be installed in a home or other location, in accordance with techniques of this disclosure.

FIG. 25 illustrates one configuration of an example identification system, in the form of a data acquisition and analysis system (DAAS) 600 that may be installed in a home or other location, in accordance with techniques of this disclosure. In FIG. 25, multiple rooms or environments exist such as environment A, environment B and environment C, with each environment having none, one or multiple individuals. Each environment may have one or multiple signal acquisition devices. These acquisition devices may include but may not be limited to single antenna radar systems, radar systems with patch arrays, cameras, microphones, cellphone or other wearable signal detectors. Each acquisition device may be associated with a local processing and control system however as illustrated, it is not necessary for every acquisition device to have such a control system. The DAAS may also interface with output devices such as but not limited to speakers (illustrated in environment A). These output devices may be used to send messages, warnings or other information to one or multiple individuals. The data acquired from the acquisition devices from each environment may be fed into a central processing and control unit. This unit may support a user interface device through which users may interact with the DAAS. Although not specifically shown in the figure, the connection between each acquisition device and the central unit may be wireless or wired, through a common data and control bus or through individual data and control busses. Additional details about the central processing unit are provided further below. As illustrated, each environment may have one or multiple individuals. Each individual may or may not have personal devices such as personal phones or other wearable electronic devices. Signals from these devices may be acquired and sent to the central processing and control unit. Thus in general, data obtained from one or multiple acquisition devices either in combination with the data gathered from personal devices or independently, may be acquired and sent to the central processing unit. This data may be used to for various purposes including but not limited to identifying the one or multiple individuals in the one or multiple environments.

Figure 26:
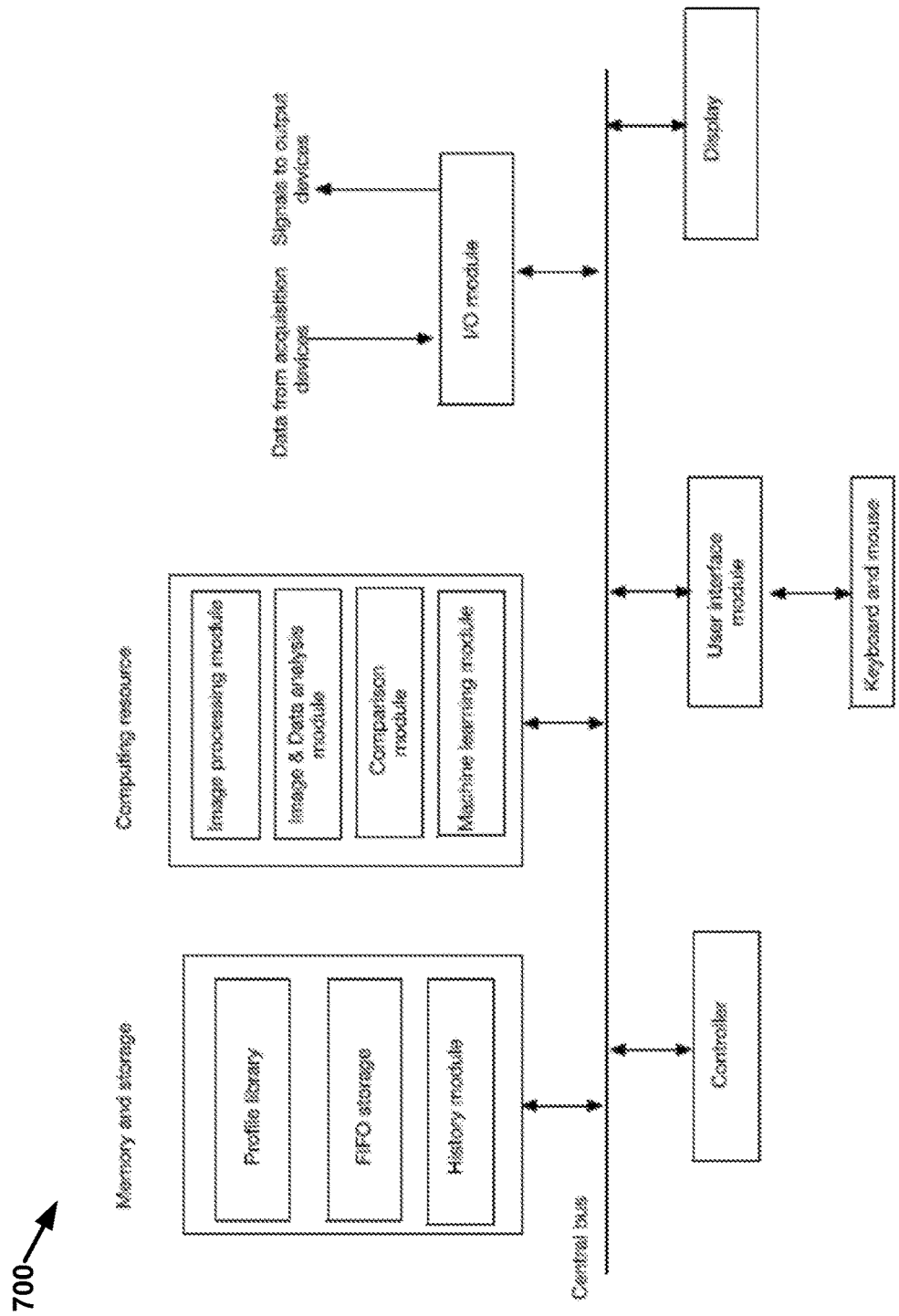
FIG. 26 is a simplified functional block diagram of a central processing and control unit that may be used in the system of FIG. 25 in accordance with the techniques of the disclosure.

FIG. 26 illustrates a functional block diagram of central processing and control unit 700 for DAAS 600, according to techniques described herein. In general, the central processing and control unit may have a memory and storage module, a computing resource, an I/O module, a controller, a user interface module and a display. The memory and storage module may be used to build and store profiles for one or multiple individuals. The computing resource may be implemented with one or multiple resources such as but not limited to central processing unit (CPU), graphics processing unit (GPU), floating point gate array (FPGA) or digital signal processor (DSP). One or many computational modules such as an image processing module, a machine learning module and a data analysis module may be implemented within such resources. The image processing module may be responsible for accessing the data from the acquisition devices and building two dimensional (2D) or three dimensional (3D) images of the environment. If multiple forms of data are available such as data from a mm-wave radar and/or data from a camera, the image processing module may also be responsible for fusing the data and building a composite image. As used herein, the data contributing to the composite image may be referred to as the "composite data." Once a composite 2D or 3D image of the environment is built, the image and data analysis module may segment the composite data in order to isolate data from or pertaining to the individuals from data from or pertaining to inanimate objects. This data segmentation or isolation step may be done using one or multiple techniques such as but not limited to computer vision techniques based on motion detection, techniques based on shape detection, etc. This segmented composite data may thus include information about the physical or physiologic data about the one or multiple individuals. Subsequent to segmentation, a comparison module may match the data to data stored in a profiles library. Additional details about an illustrative profiles library are provided below. Thus for any one time interval, the DAAS system may analyze the composite data from the one or multiple environments, identify the one or multiple individuals in the environment(s), and determine the location of these one or multiple individuals in the environment(s). The operation of matching may also be achieved using the machine learning module, as described further below.

As shown in FIG. 25, each environment may be interrogated by one or multiple acquisition systems. Each acquisition system may have its own (e.g., unique) configuration. As an example, if the interrogation system is based on radio-frequency (RF) technology, the system may have one or multiple antennas, each antenna behaving as a transmitter, a receiver or both. Thus configurations of these types of systems include but not limited to monostatic, bistatic, multistatic, and multiple input, multiple output (MIMO) configurations. As various configurations of the acquisition system are allowed, the data may also be combined using various techniques including but not limited to techniques that use coherent combinations and techniques that use incoherent combinations. Allowing coherent combinations further allows the use of synthetic aperture processing. Many benefits ensue from allowing these various configurations to exist. In one benefit, if multiple acquisition systems exist within one environment, then it may be possible to reduce or minimize the effects of occlusion as data about an individual may be collected from multiple angles. It may also be possible to use the phenomenon of multi-pathing to reduce or eliminate the effect of occlusions. Briefly, multipathing is a phenomenon where a signal bounces and re-bounces from the boundaries or other reflecting targets. As the bounce angles vary depending on the reflecting structure, it is possible that by using multipathing a desired target may be interrogated if occluded using the direct path. In an extension of the technologies described above, it is possible that signals from certain acquisition systems may cross the environment boundaries. As an example, signals from a mm-wave radar may be able to penetrate walls typically found in a home environment. This effect may be used to obtain additional data about the individuals. Data from different environments may be combined using incoherent combination techniques.

Thus using such acquisition systems, it is possible to scan the one or multiple environments and generate a 2D or 3D image of the one or multiple environments—these images would include the images of one or multiple individuals if they were present in the environments during the time of the scan. These 2D or 3D images may be segment to isolate data from the one or multiple individuals. After such segmentation, it may be further possible to isolate signals related to involuntary of voluntary activities performed by the individuals. Thus it may be possible to isolate signals related but not limited to the cardiac activity, respiration, walking, sitting, dancing, cooking etc. Each of these specific signals may be utilized alone or in combination with other data, to identify the individuals as will be described in more detail below.

Enrollment

As an initial step during the configuration of the DAAS, a process of enrollment may be included. In this process, the DAAS may request each individual enter data such as but not limited to age, weight etc. In addition to requesting entry of data, the DAAS may request the user to go to a specific location or locations within one or multiple environments from where data about this individual may be obtained by one or multiple acquisition systems. The DAAS may request the individual to perform a set of activities such as but not limited to standing in from of a specific imaging system facing the imaging system or standing in profile to the imaging system, sitting, walking etc. While these activities are being performed, data related to the individual and the specific activity may be collected, processed and stored within the profiles library (described below). Thus, during the enrollment process, data about the physical characteristics of the individual such as but not limited to height, body frame structure, posture may be obtained after processing the data. In addition to the data about the individual, if the individual was wearing personal devices or had a smart phone, that data may also be collected during the enrollment process. Part or all of this data may be used to identify this individual at a later time from data acquired at that later time. Additional details about the enrollment process will be provided as more components of the DAAS are described.

Profiles Library

The profiles library stores data about one or multiple individuals. The initial association with the data and the individual may occur at enrollment but more data about the individual or individuals may be appended over time. Thus, at initial enrollment, data providing a measure of the height may be obtained but at a subsequent time, if data about the gait was obtained then this data may also be used for identification while using height data for initial identification. Subsequently, height data and gait data may be used for identification while data about some other characteristic may be obtained. This process may continue as desired. Thus, initially and over time, a more complete profile of one or multiple individuals may be created. More details about the profiles library will be provided below.

Identification Based on Physical or Physiologic Characteristics

Each individual typically has identifiable characteristics such as but not limited to height, weight, gait, posture, favorite activities, favorite locations to be in, body frame structure, voice etc. These characteristics are typically not used by identification systems of today. In one configuration, the DAAS described in FIGS. 25 and 26 uses one or multiple of these physical characteristics for the purposes of identification. The type of signal acquisition system used to interrogate the individuals, determines which of these or other characteristics may be utilized for identification. As an example, with the UWB or the mm-wave radar, it may be possible to obtain information about the height, body frame structure, gait and posture of one or multiple individuals. Conventional identification technologies such as but not limited to those based on voice or images may also be used when available. An example of how this may be accomplished is provided below.

Figure 27:
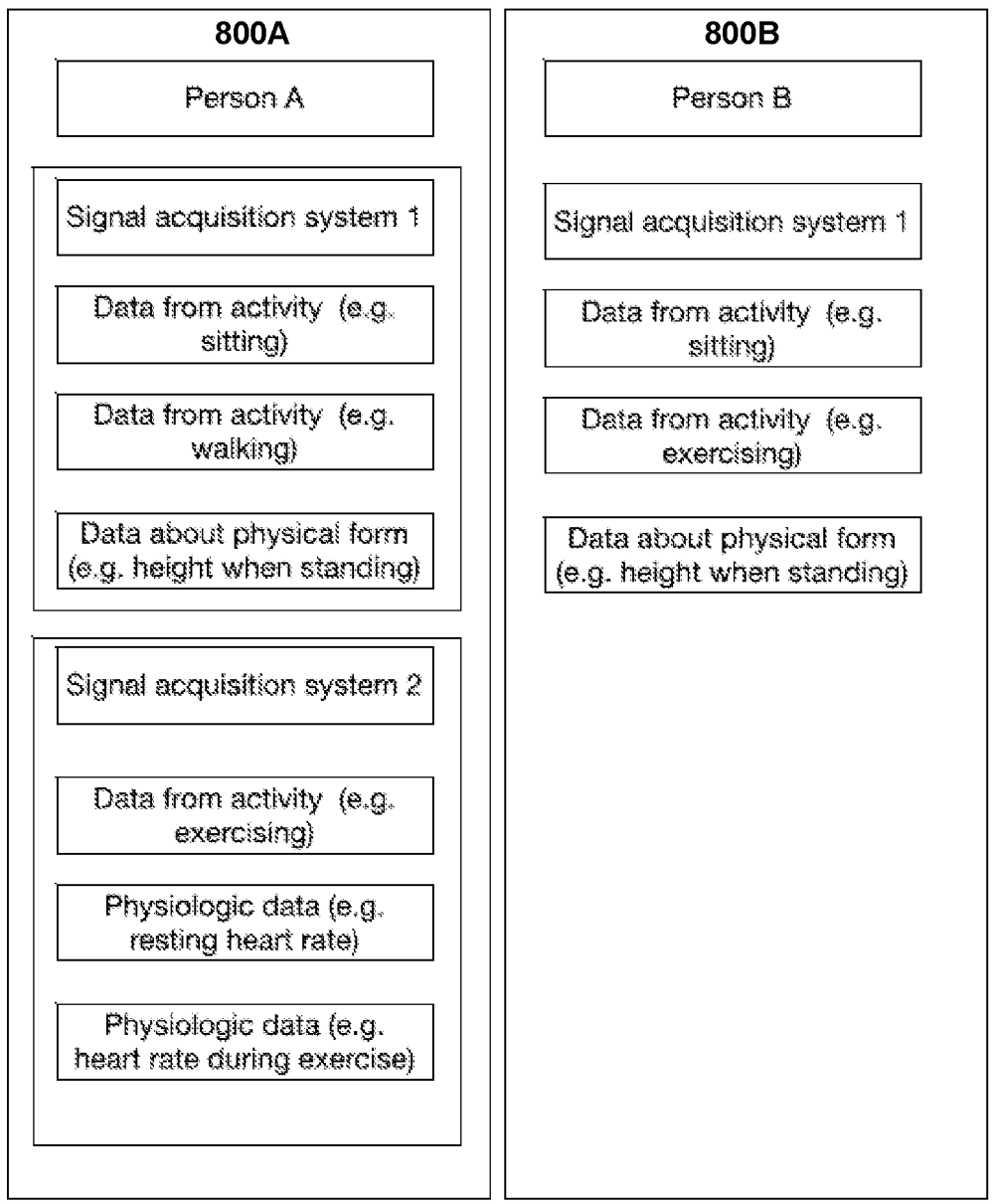
FIG. 27 is a simplified schematic diagram of an exemplary profile library that may be used by a system as disclosed herein in accordance with the techniques of the disclosure.

Using the FIG. 25 environment A as an example, signal acquisition system 1 may be a single antenna mm-wave radar system. This signal acquisition system may send out pulses and receive pulses back from reflective targets such as an individual. On the assumption that the acquisition system is scanning environment A, an outline of all the reflective targets in the scanning plane may be obtained. Further, if the scanning sequence follows a zig zag or similar patterns, then a three-dimensional (3D) scan of the environment may be performed. In this case a 3D outline of the objects including the individual or individuals within the environment may be obtained. The scanning sequence may be imposed upon the signal acquisition system by the local processing and control sub-system associated with the signal acquisition system 1, by controlling a scanning stage that may be coupled to the acquisition system. The data from the signal acquisition system 1 may be sent to the central processing and control unit where 2D or 3D images of the environment may be generated. The images may then be segmented to isolate data related to the physical or physiologic activity of one or multiple individuals. Subsequent to isolation, comparisons to similar data existing in the profiles may be made to perform the identification step. FIG. 27 outlines one configuration of the profiles library that may be utilized for the comparison and identification step.

FIG. 27 is a simplified schematic diagram of an exemplary profile library that may be used by a system as disclosed herein in accordance with the techniques of the disclosure. In FIG. 27, two example profiles 800A-800B of the profile library are illustrated, one from individual A and one from individual B. For individual A, data was obtained from two acquisition systems. As an example, from acquisition system 1, data while individual A was sitting or walking was gathered. In addition, data about the physical form (height) was gathered and added to the profile. From acquisition system 2, data about other activities (e.g., exercising) was gathered along with physiologic data (resting heart rate, heart rate during exercise). Thus when new data is acquired, and segmented, the segmented data may be compared to the data in the profiles library for each person. If threshold criteria are met for a match, then a match is successfully declared within the DAAS.

Identification Based on Activity

In some cases, the identification may be based on physical activity such as but not limited to gait, running inside the house, posture while walking, dancing that may occur inside the house etc. Taking gait as an example, during the initial enrollment process or subsequently, the DAAS may request that an individual go to a certain location and be interrogated by one or multiple acquisition systems. The DAAS may subsequently request the individual to walk a certain distance while being scanned. From this process, the data related to gait, for example the data about the posture while walking or the cadence of the steps or the step length may be isolated. If a mm-wave radar is used, this data may be obtained by scanning the environment, forming 3D images, and segmenting the data related to the individual. Further segmentation may be accomplished to isolate data relevant to the legs. When data relevant to the legs are isolated, parameters such as step length and cadence may be measured. This data related to gait may then be added to the profile of the individual. Taking step length as an example, at a later time after enrollment, data about the step length from a "unknown" individual may be estimated and compared to step length data of individuals already in the profiles library. If the data matches within a certain predetermined threshold, a match is confirmed and reported.

In another configuration, the data from one or multiple individuals may be classified according to the type of activity performed. For this configuration, the DAAS may be trained with external annotated data bases utilizing the machine learning module. Once the system is trained, it may be possible for any new data to be classified according to one of the annotated classes, enabling a match and therefore an identification to be made. It may also be possible that the DAAS allows the user or users to annotate the data obtained from the local environment. In an example of how this may occur, the DAAS may select one or multiple images showing an individual performing an activity and present these one or multiple images to the user. The DAAS may provide selection tools that allow the user to draw boundaries around images of the objects or select certain section of the image and then request the user to annotate the selected sections. Using this or similar techniques, the user may annotate various elements of the image including but not limited to activities. Once annotated data about activities exist for one or multiple individuals, when data is acquired from an "unknown" individual, the data may be compared to the annotated data bases and an identification may be obtained.

In a variation of this configuration, prior to asking the user to annotate, the DAAS may group the data according to activities for one or multiple individuals, without necessarily knowing what the activity is, by finding similar patterns in the data. Thus as an example, data related to the activity of sitting may be grouped together for one individual regardless of when it occurred and in which environment it occurred. The data related to the activity of sitting (although the system may not know the name of the activity) may be classified through the use of multiple features such as but not limited to the change in height of an individual. Thus when the DAAS analyses data associated with an individual, and if this data suggested that the individual had a different height then when enrollment occurred, it may classify such data in one group. As a note, the different height may have occurred due to the sitting position of the individual. This grouped but unannotated data may also be used for identification when a data from an "unknown" individual is acquired and the features of the new data matched the features of the unannotated but grouped data. Thus unannotated data may be used for identification as well.

Identification Based on Physiologic Characteristics

It was mentioned above that physiologic characteristics may be used to identify one or multiple individuals. These characteristics may be used independently or in conjunction with other characteristics to achieve the identification. Various types of physiologic data or surrogates of the physiologic data may be used including but not limited to ECG, respiratory signals etc. The type of data that is obtained depends on the signal acquisition system. As an initial step in the use of physiologic data, this data should be isolated from the signals coming from the environment. This isolation may be achieved in the central processing unit utilizing the image and data analysis module. Depending on the type of data that is to be isolated, various filters or other operations may be utilized. To be able to achieve identification, such data may need to be gathered during the enrollment process or after the enrollment process. To explain this with an example, the enrollment process may request that an individual go to a certain location and be interrogated by one or multiple acquisition systems. During these interrogations, the electrocardiogram (ECG) may be measured for a certain duration of time such as two or three minutes or other durations of time. These measurements may then be used to compare measurements obtained at a later time and if a match is obtained within certain acceptable criteria, then identification is made. Continuing this example, the match may be obtained using various methods including but not limited to cross-correlating the ECG signal obtained during enrollment to the isolated ECG signal obtained at another time. Thus, physiologic characteristics may be used by themselves or in conjunction with other characteristics to obtain identification.

In another configuration, identification may be accomplished by obtaining physiologic signals from one or multiple individuals after they perform some activity such as but not limited to walking across the room and by analyzing these signals to find patterns that may be unique to each individual. As an example, two different individuals may perform the same activity (e.g. walk across the room), and both may show some increase in heart rate but measures such as the amount of increase for a specific level and type of activity, the speed at which the heart rate increases for that activity, and the rate at which it returns to baseline after that activity, may differ from individual to individual. These patterns may be first observed and be associated with the individuals during the enrollment process or at a later time. After such association is made, these patterns may be utilized for identifying the one or multiple individuals.

Identification on Stimulus Response Actions

In another configuration, a stimulus is provided and the response is observed via the acquisition system. The response may be unique to each individual. This individuality may be imaged or measured with the DAAS and may be used for identification. To illustrate this with an example, in FIG. 25 environment A, speakers are coupled to the local processing and control unit associated with the signal acquisition system 1. Utilizing this speaker, the central processing and control unit may send an audio message to the individual or individuals in environment A, and analyze the data returning from acquisition system 1 subsequent to providing the stimulus. The content of the audio message may be of various types. As an example, the audio message may be a request for the individual or individuals to perform an activity such as raise their right arms or walk a few steps. These activities may be done uniquely by each individual. Thus if the individuals were being scanned at the time they were performing this activity, the data may be analyzed and an identification may be made utilizing the techniques described above.

Identification Based on Auxiliary Data

In yet another configuration, auxiliary data emanating from devices that may be worn by an individual or individuals, may be used in independently or in conjunction with other data to obtain an identification. Referring to FIG. 25 environment C, individual C is shown having a wearable and individual D is shown having a cell phone. Also shown is a signal detector that detects signals from the wearable or the cell phone. When this signal is processed by the central processing and control unit, if during the enrollment process or subsequently the signal from the cell phone or the personal device was captured and stored, then an identification may be obtained. As cell phones and wearables may be worn or used by individuals other than the owners, other characteristics may be used in conjunction with this auxiliary data to make an identification.

Tracking

Since it is possible that the one or multiple acquisition systems may be scanning continuously, it may be possible to track the one or multiple individuals as they move around the house. Thus as an individual or individuals go from environment to environment, the DAAS system may perform identification of these one or multiple individuals and know where each individual may be located. Tracking may be accomplished by using one or multiple types of the data acquisition systems; the data from the acquisition systems may be used individually or in combination with data from multiple acquisition systems to accomplish tracking. As an example, while mm-wave radar may be used to identify an individual in environment A, this same individual may be identified using his or her voice in environment B. Thus a temporal history of the one or multiple individuals may be generated and stored within the history module (described below). This type of capability may be beneficial in many situations such as in individuals with Alzheimer's disease. The benefit is more completely discussed below after the history module is described.

History Module

In this configuration, the DAAS system may store the location of the one or multiple individuals as they move about within the one or multiple environments, along with the activities the one or multiple individuals were performing. In addition, the time of occurrence may also be stored. This history is stored within the storage module and may be accessed by the users for review or other uses. The user may be provided tools such as scrolling tools to efficiently navigate through the stored data sets. The DAAS system may provide the option of scrolling through images formed by the acquisition systems or it may just provide a history of where one or multiple individuals were present along with the times they were present at that location.

Identification Process

Techniques for using matching or classifying as a means to achieve identification are described above. It is anticipated that in many occasions, a 100% match may not occur. Thus the DAAS may allow a threshold to be set such that if the result of the matching operation is within this threshold, then a match is declared. To illustrate this with an example, if two the ECG from a scan has a 90% correlation to an ECG that was stored during enrollment, and if the threshold for a match was set to 85%, then a match is declared. Thus the DAAS may allow such thresholds to be set for the various different types of signals that may be used for matching.

In addition to the thresholds, it is mentioned above that various characteristics may be used for identification. The DAAS may allow programming of the number of characteristics that have to match before an identification is declared. Thus for example, three characteristics may need to match before the DAAS declared an identification is successful.

The above examples, details, and scenarios are provided for illustration, and are not intended to limit the disclosure in any way. Those of ordinary skill in the art, with the included descriptions, should be able to implement appropriate functionality without undue experimentation. References in the specification to "an embodiment," "configuration," "version," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine. For example, a machine-readable medium may include any suitable form of volatile or non-volatile memory. Modules, data structures, function blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments.

In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. An identification system comprising:
    a radar sensor configured to generate a time-domain or frequency-domain signal representative of electromagnetic waves reflected from one or more objects within a three-dimensional space over a period of time; and
    a computation engine executing on one or more processors and configured to process the time-domain or frequency-domain signal to generate range and velocity data indicating motion of one or more of a head or an arm of a living subject within the three-dimensional space as two or more two-dimensional range-doppler images,
    wherein the computation engine is configured to identify, based at least on the two or more two-dimensional range-doppler images indicating the motion of the one or more of the head or the arm of the living subject and on profile data representative of motions of one or more living subjects, biographical data for the living subject and output an indication of an identity of the living subject.

2. The system of claim 1, wherein the computation engine is configured to process the range and velocity data using a machine learning system to match the motion by the living subject within the three-dimensional space to motions of one or more living subjects learned by the machine learning system.

3. The system of claim 2, wherein the machine learning system is configured to apply a neural network (NN) to the range and velocity data to identify the living subject.

4. The system of claim 2, wherein the machine learning system is configured to apply a convolution neural network (CNN) that learns a feature from the range and velocity data;
    wherein the machine learning system is configured to apply a long short term memory (LSTM) network that learns temporal and dynamic aspects of the feature, and
    wherein the machine learning system is configured to identify the living subject using a combination of results from both the CNN and the LSTM network.

5. The system of claim 1, wherein the indication of the identity of the living subject comprises one or more of:
    tracking information for the living subject that indicates a location of the living subject within the three-dimensional space;
    activity information for the living subject that indicates one or more activities performed by the living subject; and
    passive training information for training a machine learning system, the passive training information indicating identification data for the living subject, the identification data descriptive of one or more activities of the living subject.

6. The system of claim 1, wherein the computation engine is configured to identify the biographical data based on the motion of both the head and arm of the living subject.

7. The system of claim 1,
    wherein the motion by the living subject within the three-dimensional space corresponds to one or more activities performed by the living subject, and
    wherein, to identify the living subject, the computation engine matches the one or more activities performed by the living subject to learned activities for one or more living subjects stored to profile data for the one or more living subjects.

8. The system of claim 1, wherein the computation engine is configured to initiate an enrollment process for the living subject to at least cause the sensor to generate a training time-domain or frequency-domain signal representative of the three-dimensional space,
    wherein the computation engine is configured to receive, as part of the enrollment process, the training time-domain or frequency-domain signal,
    wherein the computation engine is configured to process the training time-domain or frequency-domain signal to generate training range and velocity data indicating motion by the living subject performing one or more enrollment activities, and wherein the computation engine is configured to process, using a machine learning system, the training range and velocity data to generate a profile for the living subject for the one or more enrollment activities.

9. The system of claim 8, further comprising:
a hardware user interface configured to output a challenge to the living subject to perform the one or more enrollment activities, wherein, to initiate the enrollment process, the computation engine is configured to cause the hardware user interface to output a message to the living subject to perform the one or more enrollment activities.

10. The system of claim 8, wherein, to initiate the enrollment process, the computation engine is configured to determine that the system does not store a profile for the living subject and that the living subject is to perform the one or more enrollment activities.

11. The system of claim 1, further comprising:
a physiological sensor that receives physiological data indicating one or more physiological characteristics of the living subject, wherein the computation engine is configured to receive the physiological data, and wherein, to identify the living subject, the computation engine identifies the living subject based at least on the one or more physiological characteristics of the living subject and the range and velocity data indicating the motion by the living subject.

12. The system of claim 1, wherein the one or more objects comprise at least one object in addition to the living subject and wherein the range and velocity data indicate the at least one object in addition to the living subject.

13. The system of claim 1,
wherein, to identify the biographical data, the computation engine is configured to process the two or more two-dimensional range-doppler images to match the motion of the one or more of the head or the arm of the living subject within the three-dimensional space to the motions of one of the one or more living subjects represented by the profile data.

14. A method comprising:
generating a time-domain or frequency-domain signal representative of electromagnetic waves reflected from one or more objects within a three-dimensional space over a period of time;

processing, by a computation engine executing on one or more processors, the time-domain or frequency-domain signal to generate range and velocity data indicating motion of one or more of a head or an arm of a living subject within the three-dimensional space as two or more two-dimensional range-doppler images;

identifying, by the computation engine, based at least on the two or more two-dimensional range-doppler images indicating the motion of the one or more of the head or the arm of the living subject and on profile data representative of motions of one or more living subjects, biographical data for the living subject; and outputting, by the computation engine, an indication of an identity of the living subject.

15. The method of claim 14, further comprising processing the range and velocity data using a machine learning system to match the motion by the living subject within the three-dimensional space to motions of one or more living subjects learned by the machine learning system.

16. The method of claim 15, wherein processing the range and velocity data using the machine learning system comprises applying a neural network (NN) to the range and velocity data to identify the living subject.

17. The method of claim 15, wherein processing the range and velocity data using the machine learning system comprises:
applying a convolution neural network (CNN) that learns a feature from the range and velocity data;
applying a long short term memory (LSTM) network that learns temporal and dynamic aspects of the feature; and
identifying the living subject using a combination of results from both the CNN and the LSTM network.

18. The method of claim 14,
wherein identifying the biographical data comprises processing the two or more two-dimensional range-doppler images to match the motion of the one or more of the head or the arm of the living subject within the three-dimensional space to the motions of one of the one or more living subjects represented by the profile data.

19. A computing system comprising:
a memory; and
one or more processors coupled to the memory, wherein the one or more processors are configured to:
receive a time-domain or frequency-domain signal, generated by a radar sensor, that is representative of electromagnetic waves reflected from one or more objects within a three-dimensional space over a period of time;
process the time-domain or frequency-domain signal to generate range and velocity data indicating motion of one or more of a head or an arm of a living subject within the three-dimensional space as two or more two-dimensional range-doppler images;
identify, based at least on the two or more two-dimensional range-doppler images indicating the motion of the one or more of the head or the arm of the living subject and on profile data representative of motions of one or more living subjects, biographical data for the living subject; and
output an indication of an identity of the living subject.

20. The computing system of claim 19,
wherein, to identify the biographical data, the one or more processors are configured to process the two or more two-dimensional range-doppler images to match the motion of the one or more of the head or the arm of the living subject within the three-dimensional space to the motions of one of the one or more living subjects represented by the profile data.

21. An identification system comprising:
a radar sensor configured to generate a time-domain or frequency-domain signal representative of electromagnetic waves reflected from one or more objects within a three-dimensional space over a period of time; and
a computation engine executing on one or more processors and configured to process the time-domain or frequency-domain signal to generate range and velocity data indicating motion of one or more of a head or an arm of a living subject within the three-dimensional space as two or more two-dimensional range-doppler images, wherein the computation engine is configured to identify, based at least on the two or more two-dimensional range-doppler images indicating the motion of the one or more of the head or the arm of the living subject and on profile data representative of motions of one or more living subjects, an activity being performed by the living subject and output an indication of the activity being performed by the living subject.

* * * * *